(12) United States Patent
Lu et al.

(10) Patent No.: US 12,557,145 B2
(45) Date of Patent: *Feb. 17, 2026

(54) COMMUNICATION METHOD AND MULTILINK DEVICE

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/268,828

(22) Filed: Jul. 14, 2025

(65) Prior Publication Data

US 2025/0351177 A1 Nov. 13, 2025

Related U.S. Application Data

(63) Continuation of application No. 18/799,642, filed on Aug. 9, 2024, which is a continuation of application No. PCT/CN2022/077529, filed on Feb. 23, 2022.

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC ............ Y02D 30/70; H04W 74/0816; H04W 74/0866; H04W 84/12
See application file for complete search history.

(56) References Cited

U.S. PATENT DOCUMENTS

| | | | |
|---|---|---|---|
| 2019/0268850 A1* | 8/2019 | Kim | H04W 74/08 |
| 2021/0211871 A1* | 7/2021 | Chu | H04W 12/06 |
| 2021/0250963 A1* | 8/2021 | Seok | H04W 72/12 |
| 2021/0321410 A1* | 10/2021 | Patil | H04W 74/006 |
| 2022/0141770 A1* | 5/2022 | Ahn | H04W 52/0235 370/318 |
| 2023/0047705 A1* | 2/2023 | Xin | H04W 74/0808 |
| 2023/0058871 A1* | 2/2023 | Xin | H04W 74/0816 |

(Continued)

FOREIGN PATENT DOCUMENTS

CN 113259046 A 8/2021

OTHER PUBLICATIONS

International Search Report and Written Opinion of the International Searching Authority regarding International Patent Application No. PCT/CN2022/077529, dated Oct. 19, 2022. Translation provided by WIPO Translate.

(Continued)

*Primary Examiner* — Kashif Siddiqui
(74) *Attorney, Agent, or Firm* — BAYES PLLC

(57) ABSTRACT

A communication method includes: performing, by a first MLD, a first operation, the first operation being used to cause a first STA affiliated to a non-AP MLD to enter a listening operation state before a start point of a first r-TWT SP, where the first STA is an r-TWT scheduled station corresponding to the first r-TWT SP.

12 Claims, 25 Drawing Sheets

(56) References Cited

U.S. PATENT DOCUMENTS

| | | | | |
|---|---|---|---|---|
| 2023/0103061 A1* | 3/2023 | Shafin | ............... | H04W 52/0216 |
| | | | | 370/311 |
| 2023/0199847 A1* | 6/2023 | Xin | ..................... | H04W 72/512 |
| | | | | 370/329 |
| 2024/0407003 A1* | 12/2024 | Lu | ..................... | H04W 74/0816 |
| 2025/0071813 A1* | 2/2025 | Ryu | ..................... | H04L 5/0053 |

OTHER PUBLICATIONS

IEEE P802.11be™/D1.4; Draft Standard for Information technology—Telecommunications and information exchange between systems Local and metropolitan area networks—Specific requirements; Part 11: Wireless LAN Medium Access Control (MAC) and Physical Layer (PHY) Specifications; IEEE P802.11be™/D1.4, Jan. 2022.
CC36 Comment Resolution for Some CIDs for 35.7.4.1 Restricted TWT / Channel Access; Chunyu Hu etc. (Meta); IEEE 802.11-21/1929r4; Nov. 27, 2021.

* cited by examiner

300

Performing, by a first MLD, a first operation, the first operation being used to cause a first STA affiliated to a non-AP MLD to be in a listening operation state before a start point of a first r-TWT SP — S310

Performing, by a second MLD, a second operation, where the second operation is used to cause or preferentially cause a third STA affiliated to a non-AP MLD to enter a listening operation state or frame exchange operation state during a second r-TWT SP — S510

S710 — Performing, by an AP MLD, a third operation, where the third operation is used to make r-TWT SPs separately scheduled on two or more links not overlap in time

FIG. 7

COMMUNICATION METHOD AND MULTILINK DEVICE

CROSS-REFERENCE TO RELATED APPLICATIONS

This application is a continuation of application Ser. No. 18/799,642 filed on Aug. 9, 2024, which is a continuation application of International Application No. PCT/CN2022/077529 filed on Feb. 23, 2022, all of which are incorporated herein by reference in their entirety.

TECHNICAL FIELD

The present application relates to the field of communications, and in particular, to a communication method and a multi-link device.

BACKGROUND

In the related art, how to protect channel accessing during a restricted target wake time (r-TWT) service period (SP) to which an r-TWT scheduled station belongs is a technical problem that needs to be solved.

SUMMARY

Embodiments of the present application provide a communication method, and the method includes:
performing, by a first multi-link (multilink) device (MLD), a first operation, the first operation being used to cause a first station (STA) affiliated to a non-access point (non-AP) MLD to enter a listening operation state before a start point of a first restricted target wake time (r-TWT) service period (SP), where the first STA is an r-TWT scheduled station corresponding to the first r-TWT SP.

Embodiments of the present application provide a communication method, and the method includes:
performing, by a second multi-link device (MLD), a second operation, the second operation being used to cause or preferentially cause a third station (STA) affiliated to the non-access point (non-AP) MLD to be in a listening operation state or a frame exchange operation state during a second restricted target wake time (r-TWT) service period (SP), where the third STA is a r-TWT scheduled station corresponding to the second r-TWT SP.

Embodiments of the present application provide a communication method, which includes:
performing, by an access point (AP) multi-link device (MLD), a third operation, where the third operation is used to make restricted target wake time (r-TWT) service periods (SPs) separately scheduled on two or more links not overlap in time.

Embodiments of the present application provide a multi-link device (MLD), which includes:
a first execution module configured to perform a first operation, the first operation being used to cause a first station (STA) affiliated to a non-access point (non-AP) MLD to enter a listening operation state before a starting point of a first restricted target wake time (r-TWT) service period (SP); where the first STA is an r-TWT scheduled station corresponding to the first r-TWT SP.

Embodiments of the present application provide a multi-link device (MLD), which includes:
a second execution module configured to perform a second operation, the second operation being used to cause or preferentially cause a third station (STA) affiliated to the non-access point (non-AP) MLD to enter a listening operation state or a frame exchange operation state during a second restricted target wake time (r-TWT) service period (SP); where the third STA is a r-TWT scheduled station corresponding to the second r-TWT SP.

Embodiments of the present application provide an access point (AP) multi-link device (MLD), which includes:
a third execution module configured to perform a third operation, where the third operation is used to make r-TWT SPs separately scheduled on two or more links not overlap in time.

Embodiments of the present application provide a multi-link device (MLD), which includes a processor and a memory. The memory is configured to store a computer program, and the processor is configured to call and execute the computer program stored in the memory to cause the MLD to perform any one of the above-mentioned communication methods.

Embodiments of the present application provide a chip for implementing any one of the above-mentioned communication methods.

In some embodiments, the chip includes a processor configured to call and execute a computer program from a memory to cause a device installed with the chip to perform any one of the above-mentioned communication methods.

Embodiments of the present application provide a non-transitory computer-readable storage medium configured to store a computer program, and in response that the computer program is executed by a device, the device is caused to perform any one of the above-mentioned embodiments.

Embodiments of the present application provide a computer program product, which includes computer program instructions, and the computer program instructions cause a computer to perform any one of the above-mentioned communication methods.

Embodiments of the present application provide a computer program, and in response that the computer program is executed on a computer, the computer is caused to perform any one of the above-mentioned communication methods.

BRIEF DESCRIPTION OF THE DRAWINGS

FIG. 3 is a schematic flowchart of a communication method 300, in accordance with an embodiment of the present application.

FIG. 5 is a schematic flowchart of a communication method 500, in accordance with an embodiment of the present application

FIG. 7 is a schematic flowchart of a communication method 700, in accordance with an embodiment of the present application.

DETAILED DESCRIPTION

The technical solutions in the embodiments of the present application will be described below in conjunction with the accompanying drawings in the embodiments of the present application.

It should be noted that the terms such as "first" and "second" in the description, claims, and above-mentioned accompanying drawings of the embodiments of the present application are used for distinguishing between similar objects, and are not necessarily used for describing a particular sequence or precedence order. The objects described with "first" or "second" may be the same or different.

The technical solutions of the embodiments of the present application may be applied to various communication systems, such as wireless local area networks (WLAN), wireless fidelity (WiFi) or other communication systems.

Figure 1:
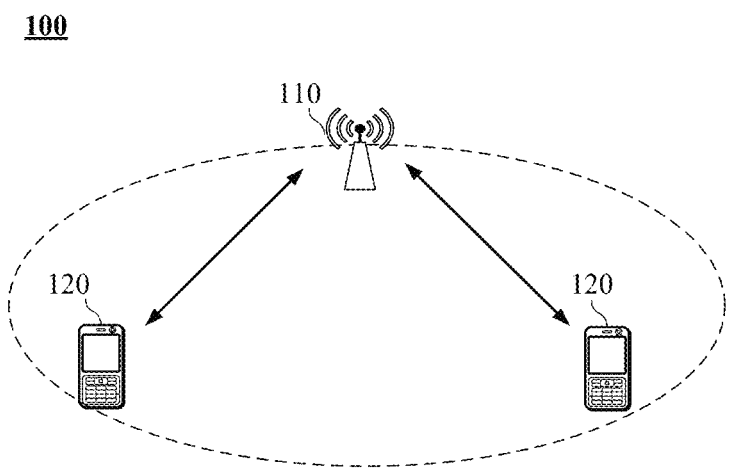
FIG. 1 is a schematic diagram of a communication system 100 in an application scenario, in accordance with embodiments of the present application.

Exemplarily, a communication system 100 applied in the embodiments of the present application is shown in FIG. 1. The communication system 100 may include an access point (AP) 110, and stations (STA) 120 accessing a network through the access point 110.

In some scenarios, AP is also referred to as AP STA, that is, in a sense, AP is also a STA.

In some scenarios, STA is also referred to as non-AP STA.

The communication in the communication system 100 may be communication between an AP and a non-AP STA, communication between a non-AP STA and a non-AP STA, or communication between a STA and a peer STA. The peer STA may be a device communicating end-to-end with the STA, for example, a peer STA may be an AP or a non-AP STA.

AP is equivalent to a bridge connecting wired network and wireless network, and the main function of which is to connect various wireless network clients together and then connect the wireless network to Ethernet. An AP device may be a terminal device (e.g., a mobile phone) or a network device (e.g., a router) with a WiFi chip.

It should be understood that the role of STA in the communication system is not absolute. For example, in some scenarios, in a case where a mobile phone is connected to a router, the mobile phone serves as a non-AP STA; and in a case where a mobile phone serves as a hotspot for other mobile phones, the mobile phone serves as an AP.

AP and non-AP STA may be devices applied in Internet of vehicles, Internet of things (IoT) nodes, sensors, or the like in IoT, smart cameras, smart remote controls, smart water or electricity meters in smart home, or sensors in smart city.

In some embodiments, non-AP STA may support 802.11be standard. Non-AP STA may also support various current and future 802.11 family wireless local area networks (WLAN) standards, such as 802.11ax, 802.11ac, 802.11n, 802.11g, 802.11b and 802.11a.

In some embodiments, AP may be a device supporting the 802.11be standard. AP may also be a device supporting various current and future 802.11 family WLAN standards, such as 802.11ax, 802.11ac, 802.11n, 802.11 g, 802.11b, and 802.11a.

In the embodiments of the present application, STA may be a device that supports WLAN/WiFi technology, such as a mobile phone, a tablet computer (Pad), a computer, a virtual reality (VR) device, an augmented reality (AR) device, an industrial control wireless device, a set-top box, a self-driving wireless device, a vehicle-mounted communication device, a remote medical wireless device, a smart grid wireless device, a transportation safety wireless device, a smart city wireless device or a smart home wireless device, or a wireless communication chip/ASIC/SOC.

The frequency bands that WLAN technology supports include but are not limited to low frequency band (e.g., 2.4 GHz, 5 GHz, or 6 GHz) and high frequency band (e.g., 60 GHz).

FIG. 1 exemplarily shows an AP STA and two non-AP STAs. In some implementations, the communication system 100 may include multiple AP STAs and other quantities of non-AP STAs, which is not limited in the embodiments of the present application.

It should be understood that the terms "system" and "network" are often used interchangeably herein. The term "and/or" used herein is merely a description of the association relationship of associated objects, indicating that three relationships may exist. For example, A and/or B may represent three situations: only A exists, both A and B exist, and only B exists. In addition, the symbol "/" used herein generally represents that the relationship between the related objects before and after is "or".

It should be understood that the term "indicate" mentioned in the embodiments of the present application may be a direct indication, an indirect indication, or an indication of an associated relationship. For example, A indicates B, may represent that A directly indicates B, e.g., B may be obtained through A; it may also represent that A indirectly indicates B, e.g., A indicates C, and B may be obtained through C; it may also represent that there is an association relationship between A and B.

In the description of the embodiments of the present application, the term "corresponding" may indicate a direct or indirect correspondence between two objects, or an association relationship between the two objects, or a relationship of indicating and being indicated, configuring and being configured, etc.

In order to facilitate understanding of the technical solutions of the embodiments of the present application, the related art of the embodiments of the present application will be described below. The related art below may be arbitrarily combined with the technical solutions of the embodiments of the present application as optional solutions, and they all belong to the protection scope of the embodiments of the present application.

In the current technology, there are no defined rules on how to coordinate operations between links in the enhanced multi-link single radio (EMLSR)/enhanced multi-link multi-radio (EMLMR) links to protect channel accessing during an r-TWT service period in a case where there is a r-TWT scheduled station on the EMLSR/EMLMR links. Considering the EMLSR mode as an example, in a case where the non-AP multi-link device (non-AP MLD) works in the EMLSR mode, data exchange is only allowed on one link in the EMLSR link at one time, and when the station on one link in the EMLSR link of the non-AP MLD is performing frame exchanges, stations on other links in the EMLSR link cannot send or receive frames and are in a state of medium synchronization loss; furthermore, in the r-TWT operation, there is a need to protect the channel accessing during the r-TWT service period to meet the low-latency service access requirements of the r-TWT scheduled stations STA), which includes a case that if a station supporting r-TWT is a transmission opportunity holder (TXOP Holder), there is a need to terminate TXOP before the start time of the r-TWT service period, and there is no impact or there is a need to reduce the impact on the channel accessing of the r-TWT scheduled station during the r-TWT service period.

Figure 2A:
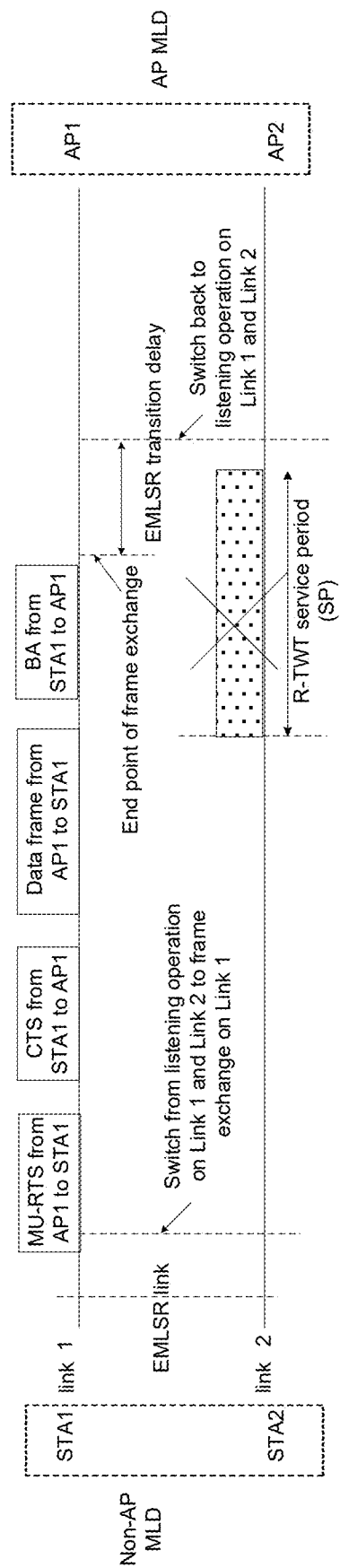
FIG. 2A is a schematic diagram showing a situation where conflict exists between an EMLSR operation mode and an r-TWT operation, in accordance with an embodiment of the present application.
Figure 2B:
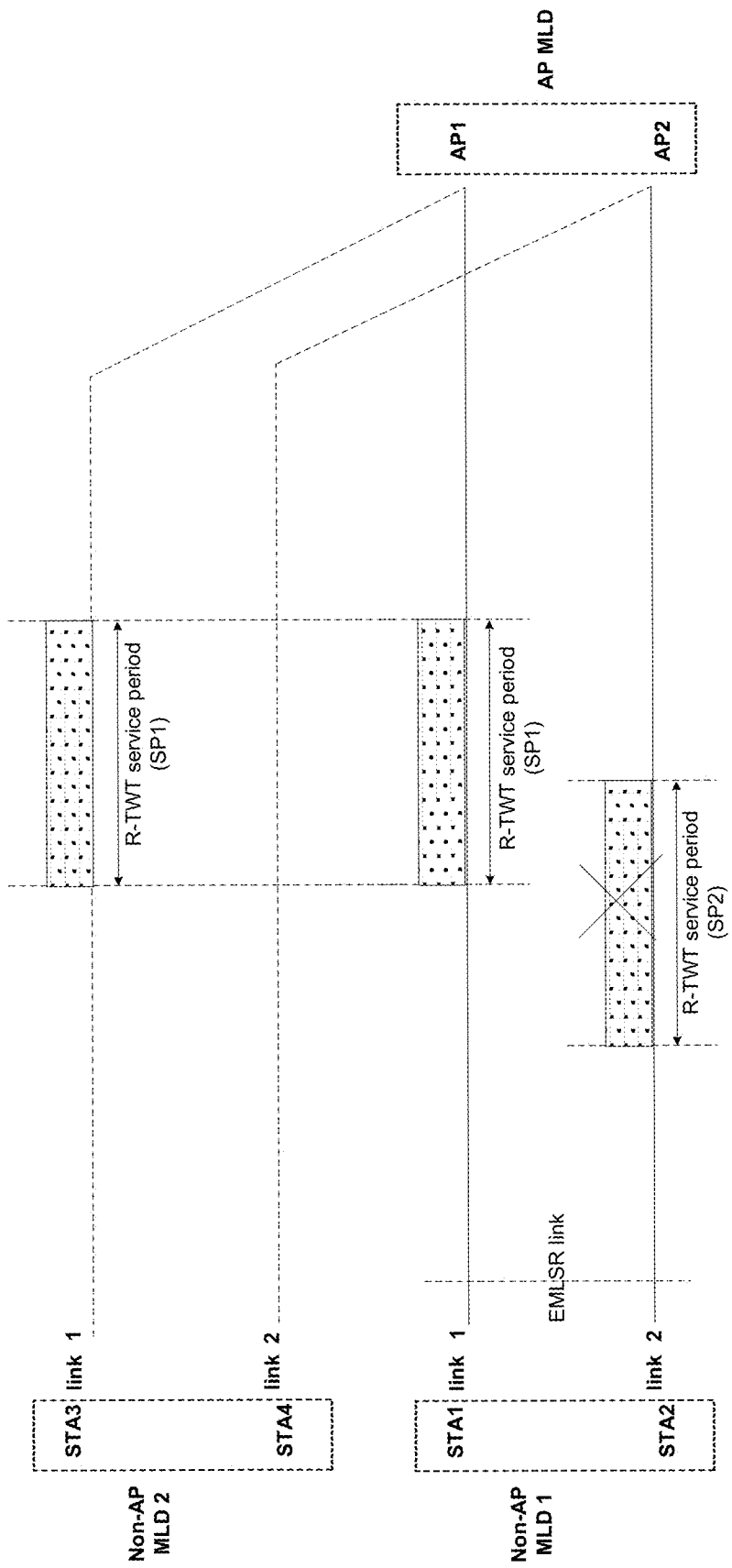
FIG. 2B is a schematic diagram showing a situation where conflict exists between the EMLSR operation mode and the r-TWT operation, in accordance with another embodiment of the present application.

FIG. 2A is a first schematic diagram showing a situation where conflict exists between an EMLSR operation mode and an r-TWT operation. Considering FIG. 2A as an example, a non-AP MLD is associated to an AP multi-link device (AP MLD) after a multi-link establishment process, where there are two links, namely Link 1 and Link 2. Meanwhile, by means of traffic identifier to link mapping (TID-To-Mapping), TID 1 and TID 2 are both mapped to Link 1 in an uplink direction and a downlink direction, while TID 3 and TID 4 are both mapped to Link 2 in the uplink direction and the downlink direction. Since the channel communication condition on Link 2 is good and suitable for the transmission of low-latency services, the AP MLD negotiates with the Non-AP MLD on Link 2 to establish a r-TWT, and TID 3 and TID 4 are determined as r-TWT uplink TID (r-TWT UL TID) and r-TWT downlink TID (r-TWT DL TID), respectively, and STA2 serves as a r-TWT scheduled station and performs low-latency service transmission during the scheduled r-TWT service period. Thus, there is a need to protect the channel accessing of STA2 during the r-TWT service period. As shown in FIG. 2A, when the non-AP MLD works in the EMLSR mode, and Link 1 and Link 2 are EMLSR links, if a period of frame exchange between STA1 affiliated to the Non-AP MLD and AP1 affiliated to the AP MLD on Link 1 overlaps with the r-TWT service period on Link 2, the channel accessing of STA2 during the r-TWT service period will be affected. As shown in FIG. 2A, frames exchanged in the frame exchange process on Link 1 may include: a multi-user request to send (MU-RTS) frame sent from AP1 to STA1, a clear to send (CTS) frame sent from STA1 to AP1, a data frame sent from AP1 to STA1, and a block acknowledgment (BA) frame sent from STA1 to AP1. FIG. 2B is a second schematic diagram showing a situation where conflict exists between the EMLSR operation mode and the r-TWT operation. Considering FIG. 2B as an example, a non-AP MLD1 and a non-AP MLD2 are associated to an AP MLD after a multi-link establishment process, where the non-AP MLD1 and the non-AP MLD2 each have two links to establish a connection with the AP MLD, which are denoted as Link 1 and Link 2. For non-AP MLD1 and AP MLD, by means of stream identifier to link mapping (TID-To-Mapping), TID 1 is mapped to Link 1 in the downlink direction, while TID 2 is mapped to Link 2 in the uplink direction. Meanwhile, for non-AP MLD2 and AP MLD, by means of stream identifier to link mapping (TID-To-Mapping), TID 1 is mapped to Link 1 in the downlink direction. The AP MLD establishes a r-TWT with the non-AP MLD1 and the non-AP MLD2 on a corresponding link separately; for example, AP1 establishes a r-TWT on Link 1 and TID1 is determined as a r-TWT downlink TID (r-TWT DL TID) for sending multicast low-latency service stream, while STA1 affiliated to non-AP MLD1 and STA3 affiliated to non-AP MLD2 are both r-TWT scheduled stations; AP2 establishes a r-TWT on Link 2 and TID2 is determined as a r-TWT uplink TID (r-TWT UL TID), and STA2 serves as a r-TWT scheduled station for sending uplink low-latency service stream during the r-TWT service period.

As shown in FIG. 2B, in a case where the non-AP MLD1 works in the EMLSR mode, and Link 1 and Link 2 are both EMLSR links, if the r-TWT service period (SP1 as shown in FIG. 2B) on Link 1 overlaps with the r-TWT service period (SP2 as shown in FIG. 2B) on Link 2, it may interfere with the Non-AP MLD1 receiving downlink low-latency service data during the r-TWT service period on Link 1, or it may interfere with Non-AP MLD1 sending uplink low-latency service data during the r-TWT service period on Link 2.

In an example in which the non-AP MLD works in the EMLSR mode, the embodiments of the present application mainly focus on the operational characteristic of the non-AP MLD operating in the EMLSR mode that data exchange is only allowed on one link in the EMLSR link at one time and the need to protect the channel accessing during the r-TWT service period to meet the low-latency service access requirements of the r-TWT scheduled station (r-TWT scheduled STA), and propose a mechanism and method on how to coordinate operations between links in the EMLSR link in the EMLSR mode to protect channel accessing during the r-TWT service period to which the r-TWT scheduled station operating on the EMLSR link belongs.

In the embodiments, a communication method is provided, which including:

performing, by a first multi-link device (MLD), a first operation, the first operation being used to cause a first station (STA) affiliated to a non-access point (non-AP) MLD to enter a listening operation state before a start point of a first restricted target wake time (r-TWT) service period (SP), where the first STA is an r-TWT scheduled station corresponding to the first r-TWT SP.

In some embodiments, the non-AP MLD operates in an enhanced multi-link single radio (EMLSR) mode, and the first STA is a station on an EMLSR link; or the non-AP MLD operates in an enhanced multi-link multi-radio (EMLMR) mode, and the first STA is a station on an EMLMR link.

In some embodiments, the first MLD includes the non-AP MLD;

performing, by the first MLD, the first operation includes:
the first STA affiliated to the non-AP MLD terminating transmission opportunity (TXOP) initiated by the first STA and/or ending frame exchange prior to an EMLSR first transition delay before the start point of the first r-TWT SP; or the first STA affiliated to the non-AP MLD terminating the TXOP initiated by the first STA and/or ending the frame exchange before the start point of the first r-TWT SP.

In some embodiments the first MLD includes the non-AP MLD;

performing, by the first MLD, the first operation includes:
a second STA affiliated to the non-AP MLD terminating TXOP initiated by the second STA and/or ending frame exchange prior to an EMLSR first transition delay before the start point of the first r-TWT SP; or the second STA affiliated to the non-AP MLD terminating the TXOP initiated by the second STA and/or ending the frame exchange prior to an EMLSR second transition delay before the start point of the first r-TWT SP; where the second STA is a station except for the first STA among stations affiliated to the non-AP MLD, and the second STA is a station on an EMLSR link.

In some embodiments the first MLD includes the non-AP MLD;

performing, by the first MILD, the first operation includes:
in response that frame exchange to be initiated by a second STA affiliated to the non-AP MLD overlaps with the first r-TWT SP, the second STA stopping or delaying initiating the frame exchange; or
in response that an end point of the frame exchange to be initiated by the second STA affiliated to the non-AP MILD is earlier than the start point of the first r-TWT SP, and a time interval between the end point of the frame exchange to be initiated by the second STA and the start point of the first r-TWT SP does not greater than an EMLSR first transition delay duration/EMLSR second transition delay duration, the second STA stopping or delaying initiating the frame exchange;
where the second STA is a station except for the first STA among stations affiliated to the non-AP MLD, and the second STA is a station on an EMLSR link.

In some embodiments, the first MLD includes the non-AP MILD;

performing, by the first MLD, the first operation includes:
in response that an AP associated to a second STA affiliated to the non-AP MLD initiates frame exchange with the second STA, and the frame exchange overlaps with the first r-TWT SP in time, the second STA does not responding to an initial control frame transmitted by the AP associated to the second STA for initiating the frame exchange; or
in response that the AP associated to the second STA affiliated to the non-AP MLD initiates the frame exchange with the second STA, an end point of the frame exchange is earlier than the start point of the first r-TWT SP, and a time interval between the end point of the frame exchange and the start point of the first r-TWT SP does not greater than an EMLSR first transition delay duration/EMLSR second transition delay duration, the second STA does not responding to the initial control frame transmitted by the AP associated to the second STA for initiating the frame exchange;
where the second STA is a station except for the first STA among stations affiliated to the non-AP MLD, and the second STA is a station on an EMLSR link.

In some embodiments, the first MLD includes an AP MLD associated to the non-AP MLD;

performing, by the first MLD, the first operation includes:
a first AP affiliated to the AP MLD terminating TXOP initiated by the first AP and/or ending frame exchange prior to a timeout interval before the start point of the first r-TWT SP, or the first AP affiliated to the AP MLD terminating the TXOP initiated by the first AP and/or ending the frame exchange prior to a sum of an EMLSR first transition delay and the timeout interval before the start point of the first r-TWT SP, where the first STA is associated to the first AP.

In some embodiments, the first MLD includes an AP MLD associated to the non-AP MLD;

performing, by the first MLD, the first operation includes:
a second AP affiliated to the AP MLD terminating TXOP initiated by the second AP and/or ending frame exchange prior to a sum of an EMLSR first transition delay and a timeout interval before the start point of the first r-TWT SP; or the second AP affiliated to the AP MLD terminating the TXOP initiated by the second AP and/or ending the frame exchange prior to a sum of an EMLSR second transition delay and the timeout interval before the start point of the first r-TWT SP; where the second AP is associated to a second STA, the second STA is a station except for the first STA among stations affiliated to the non-AP MLD, and the second STA is a station on an EMLSR link.

In some embodiments, the AP MLD associated to the non-AP MLD supports an EMLSR mode.

In some embodiments, the EMLSR first transition delay represents a transition duration of the non-AP MLD operating in an EMLSR mode switching from a single-link frame exchange operation on an EMLSR link to a listening operation on the EMLSR link.

In some embodiments, a value of the EMLSR first transition delay is greater than or equal to 0.

In some embodiments, a value of the EMLSR first transition delay is sent by the non-AP MLD to an AP MLD when the non-AP MLD establishes multiple links with the AP MLD or the non-AP MLD instructs the AP MLD to enter the EMLSR mode.

In some embodiments, the EMLSR second transition delay represents a transition duration of the non-AP MLD operating in an EMLSR mode switching from a single-link frame exchange operation on an EMLSR link to an operation on another link in the EMLSR link.

In some embodiments, a value of the EMLSR second transition delay is greater than or equal to 0.

In some embodiments, a value of the EMLSR second transition delay is sent by the non-AP MLD to an AP MLD when the non-AP MLD establishes multiple links with the AP MLD or the non-AP MLD instructs the AP MLD to enter the EMLSR mode.

In some embodiments, the timeout interval is equal to a sum of aSIFSTime, aSlotTime, and aRxPHYStartDelay; where
the aSIFSTime represents a time nominally required for a medium access control (MAC) and a physical layer (PHY) to receive a last symbol or process frame of a frame from a wireless medium (WM) and respond with a first symbol of an earliest possible response frame on the WM;
the aSlotTime represents a time slot for the MAC to define an interframe space (IFS); and
the aRxPHYStartDelay represents a delay from start of a physical layer protocol data unit (PPDU) at a receiver antenna to issuance of a physical layer-receive start indication (PHY-RXSTART.indication) primitive.

In some embodiments, the listening operation state includes at least one of the following:
performing clear channel assessment (CCA); or
being able to receive an initial control frame of a frame exchange sequence sent by an AP MLD.

In the embodiments, a communication method is provided, which including:
performing, by a second first multi-link device (MLD), a second operation, the second operation being used to cause or preferentially cause a third station (STA) affiliated to a non-access point (non-AP) MLD to be in a listening operation state or frame exchange operation state during a second restricted target wake time (r-TWT) service period (SP), where the third STA is an r-TWT scheduled station corresponding to the second r-TWT SP.

In some embodiments, the non-AP MLD operates in an enhanced multi-link single radio (EMLSR) mode, and the third STA is a station on an EMLSR link; or
the non-AP MLD operates in an enhanced multi-link multi-radio (EMLMR) mode, and the third STA is a station on an EMLMR link.

In some embodiments, the second MLD includes the non-AP MLD,
performing, by the second MLD, the second operation includes:
forbidding, by the non-AP MLD, a fourth STA to acquire transmission opportunity (TXOP) through channel access contention during a period overlapping with the second r-TWT SP, where the fourth STA is a station except for the third STA among stations affiliated to the non-AP MLD, and the fourth STA is a station on an EMLSR link.

In some embodiments, the second MLD includes the non-AP MLD,
performing, by the second MLD, the second operation includes:
allowing, by the non-AP MLD, a fourth STA to acquire TXOP through channel access contention during a period overlapping with the second r-TWT SP, and a chance for the fourth STA to acquire TXOP through channel access contention during the period overlapping with the second r-TWT SP being smaller than a chance for the third STA to acquire TXOP through channel access contention during the second r-TWT SP, where the fourth STA is a station except for the third STA among stations affiliated to the non-AP MLD, and the fourth STA is a station on an EMLSR link.

In some embodiments, the chance for the fourth STA to acquire TXOP through channel access contention during the period overlapping with the second r-TWT SP being smaller than the chance for the third STA to acquire TXOP through channel access contention during the second r-TWT SP includes:
a priority level of an enhanced distributed channel access (EDCA) parameter set used by the fourth STA for channel access contention during the period overlapping with the second r-TWT SP being lower than a priority level of an EDCA parameter set used by the third STA for channel access contention during the second r-TWT SP.

In some embodiments, the second r-TWT SP includes a non trigger-enabled r-TWT SP.

In some embodiments, the second MLD includes an AP MLD associated to the non-AP MLD;
performing, by the second MLD, the second operation includes:
forbidding, by the AP MLD, a fourth AP to initiate frame exchange with a fourth STA during the second r-TWT SP; or
a time interval during which the fourth AP affiliated to the AP MLD initiates a frame exchange with the fourth STA does not overlapping with the second r-TWT SP;
where the fourth AP is associated to the fourth STA, the fourth STA is a station except for the third STA among stations affiliated to the non-AP MLD, and the fourth STA is a station on an EMLSR link.

In some embodiments, the AP MLD associated to the non-AP MLD supports an EMLSR mode.

In some embodiments, the listening operation state includes at least one of the following:
performing clear channel assessment (CCA); or
being able to receive an initial control frame of a frame exchange sequence sent by an AP MLD.

In some embodiments, a communication method is provided, which including:
performing, by an access point (AP) multi-link device (MLD), a third operation, where the third operation is used to make restricted target wake time (r-TWT) service periods (SPs) separately scheduled on two or more links not overlap in time.

In some embodiments, the links include an enhanced multi-link single radio (EMLSR) link and an enhanced multi-link multi-radio (EMLMR) link.

In some embodiments, performing, by the AP MLD, the third operation includes:
causing, by the AP MLD, a time interval between an end point of a third r-TWT SP and a start point of a fourth r-TWT SP to be greater than or equal to an EMLSR first transition delay, where the third r-TWT SP and the fourth r-TWT SP are on different links.

In some embodiments, the EMLSR first transition delay represents a transition duration of a non-AP MLD operating in an EMLSR mode switching from a single-link frame exchange operation on an EMLSR link to a listening operation on the EMLSR link.

In some embodiments, a value of the EMLSR first transition delay is greater than or equal to 0.

In some embodiments, a value of the EMLSR first transition delay is sent by a non-AP MLD to the AP MLD in response that the non-AP MLD establishes multiple links with the AP MLD or the non-AP MLD instructs the AP MLD to enter an EMLSR mode.

In some embodiments, performing, by the AP MILD, the third operation includes:
causing, by the AP MLD, a time interval between an end point of a third r-TWT SP and a start point of a fourth r-TWT SP to be greater than or equal to an EMLSR second transition delay, where the third r-TWT SP and the fourth r-TWT SP are on different links.

In some embodiments, the EMLSR second transition delay represents a transition duration of a non-AP MLD operating in an EMLSR mode switching from a single-link frame exchange operation on an EMLSR link to an operation on another link in the EMLSR link.

In some embodiments, a value of the EMLSR second transition delay is greater than or equal to 0.

In some embodiments, a value of the EMLSR first transition delay is sent by a non-AP MLD to the AP MLD in response that the non-AP MLD establishes multiple links with the AP MLD or the non-AP MLD instructs the AP MLD to enter an EMLSR mode.

In some embodiments, a value of the EMLSR first transition delay is sent by a non-AP MLD to the AP MLD in response that the non-AP MLD establishes multiple links with the AP MLD or the non-AP MLD instructs the AP MLD to enter an EMLSR mode.

FIG. 3 is a schematic flowchart of a communication method 300 according to an embodiment of the present application. The method may optionally be applied to the system shown in FIG. 1, but is not limited thereto. The method includes at least part of the following:

S310, performing, by a first MLD, a first operation, the first operation being used to cause a first STA affiliated to a non-AP MLD to enter a listening operation state before a start point of a first r-TWT SP, where the first STA is an r-TWT scheduled station corresponding to the first r-TWT SP.

In the embodiments of the present application, the r-TWT scheduled station corresponding to the r-TWT SP may be referred to as a member r-TWT scheduled station of the r-TWT SP. The first STA may also be referred to as a member r-TWT scheduled station of the first r-TWT SP.

In some embodiments, the first MLD performing the first operation, the first operation being used to cause the first STA affiliated to the non-AP MLD to enter the listening operation state before the start point of the first r-TWT SP may include: the first MLD ensuring that the first STA affiliated to the non-AP MLD enters the listening operation state before the start point of the first r-TWT SP.

In some embodiments, the non-AP MLD is associated with an AP MLD, the first STA affiliated to the non-AP MLD is associated with a first AP affiliated to the AP MLD, the first STA establishes an r-TWT with the first AP, and the first STA is the r-TWT scheduled station corresponding to the first r-TWT SP.

The first MLD may be the non-AP MLD or an AP MLD associated with the non-AP MLD; that is, the non-AP MLD or the AP MLD associated with the non-AP MLD ensures that the first STA affiliated to the non-AP MLD enters the listening operation state before the start point of the first r-TWT SP. In the following embodiments, implementations in the case where the first MLD is a non-AP MLD or an AP MLD associated with a non-AP MLD will be introduced.

The non-AP MLD may operate in the EMLSR mode, and accordingly, the first STA is a station on the EMLSR link; alternatively, the non-AP MLD may work in the EMLMR mode, and accordingly, the first STA is a station on the EMLMR link.

The following description will be made by taking an example in which the non-AP MLD works in the EMLSR mode.

Considering an example in which the non-AP MLD operates in the EMLSR mode, the embodiments of the present application relate to the operation mode of the EMLSR link before the start point of the r-TWT SP.

In an example, the non-AP MLD is associated to an AP MLD after a multi-link establishment process, where there are two links, namely Link 1 and Link 2. In a case where the non-AP MLD and the AP MLD support the EMLSR mode, and the non-AP MLD operates in the EMLSR mode on the EMLSR link (Link 1 and Link 2), a station (e.g., STA1) of the non-AP MLD on the EMLSR link establishes a r-TWT with an AP (e.g., AP1) associated with the AP MLD, and the STA1 is the r-TWT scheduled station of a specific r-TWT SP, and thus there is a need to ensure that the STA1 is in a listening operation state before these r-TWT service periods start.

In some implementations, the listening operation state includes at least one of the following:
performing clear channel assessment (CCA); or
being able to receive an initial control frame of a frame exchange sequence sent by the AP MLD.

In some implementations, the first MLD includes the non-AP MLD;
performing, by the first MLD, the first operation may include:
the first STA affiliated to the non-AP MLD terminating transmission opportunity (TXOP) initiated by the first STA and/or ending frame exchange prior to an EMLSR first transition delay before the start point of the first r-TWT SP, or the first STA affiliated to the non-AP MLD terminating the TXOP initiated by the first STA and/or ending the frame exchange before the start point of the first r-TWT SP.

This example may be applicable to the case where the first STA is a transmission opportunity holder (TXOP Holder) before the first r-TWT SP starts.

Figure 4A:
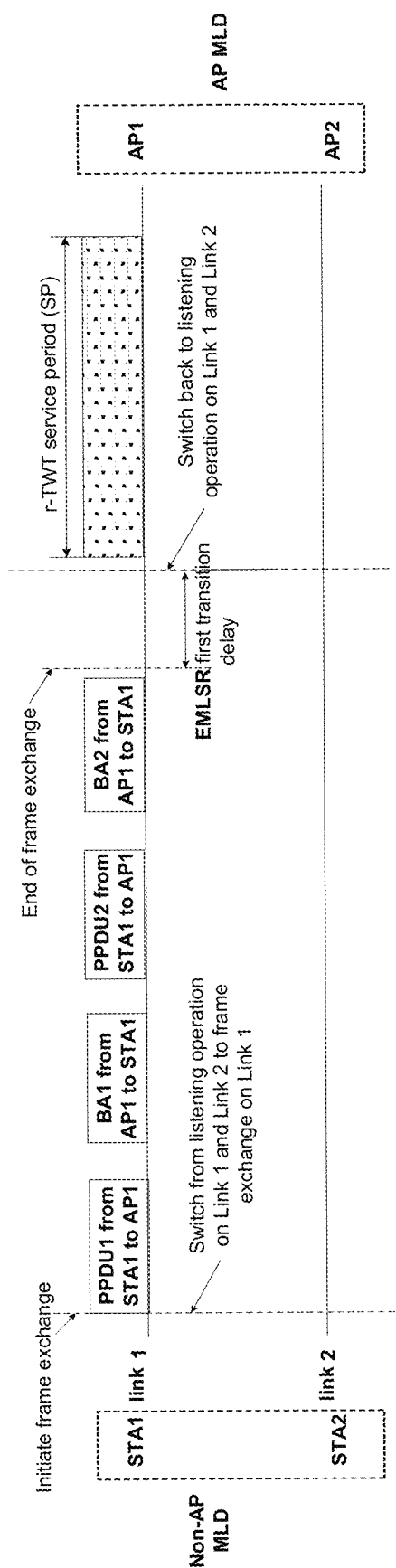
FIG. 4A is a schematic diagram showing an implementation for ensuring that a r-TWT scheduled station corresponding to a r-TWT SP enters a listening operation state before the r-TWT SP starts, in accordance with embodiments of the present application.

FIG. 4A is a schematic diagram of an implementation for ensuring that the r-TWT scheduled station corresponding to the r-TWT SP enters a listening operation state before the r-TWT SP starts, in accordance with embodiments of the present application. As shown in FIG. 4A, in a case where the station STA1 is a transmission opportunity holder (TXOP Holder) before the r-TWT service period starts, there is a need to ensure that STA1 terminates the TXOP initiated by STA1 or ends the frame exchange initiated by STA1 prior to an EMLSR first transition delay before the start point of the r-TWT service period, so that it is ensured that the STA1 is able to enter the listening operation state before the r-TWT service period starts and after terminating the TXOP or ending the frame exchange initiated by STA1 and after the EMLSR first transition delay. The EMLSR first transition delay may represent a transition duration of the non-AP MLD operating in the EMLSR mode switching from the single link (e.g., Link 1 in FIG. 4A) frame exchange operation on the EMLSR link to the listening operation on the EMLSR link (e.g., Link 1 and Link 2 in FIG. 4A).

The value of the EMLSR first transition delay may be greater than or equal to 0.

In some implementations, the value of the EMLSR first transition delay may be sent by the non-AP MLD to the AP MLD when the non-AP MLD establishes multiple links with the AP MLD or when the non-AP MLD instructs the AP MLD to enter the EMLSR mode.

Figure 4B:
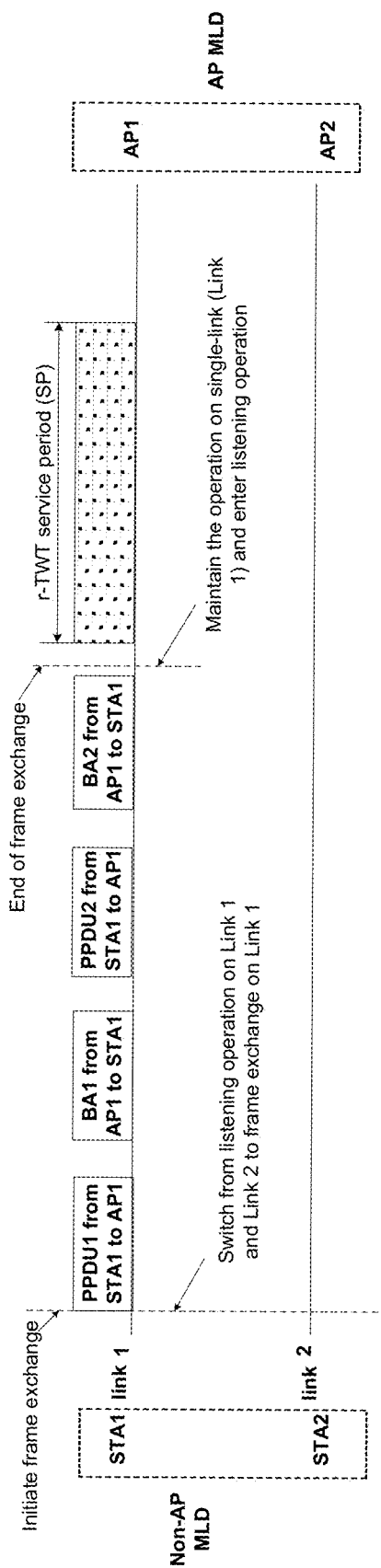
FIG. 4B is a schematic diagram showing another implementation for ensuring that a r-TWT scheduled station corresponding to a r-TWT SP enters a listening operation state before the r-TWT SP starts, in accordance with embodiments of the present application.

FIG. 4B is a schematic diagram of another implementation for ensuring that the r-TWT scheduled station corresponding to the r-TWT SP enters the listening operation state before the r-TWT SP starts, in accordance with embodiments of the present application. As shown in FIG. 4B, in a case where the station STA1 is a transmission opportunity holder (TXOP Holder) before the r-TWT service period starts, there is a need to ensure that the STA1 terminates the TXOP initiated by STA1 or ends the frame exchange initiated by STA1 before the start point of the r-TWT service period, while maintains the single link operation on Link 1 and enters the listening operation state and does not perform the listening operation on Link 2, without switching to the listening operation on the EMLSR link (e.g., Link 1 and Link 2 as shown in FIG. 4B).

In some implementations, the first MLD includes a non-AP MLD;
performing, by the first MLD, the first operation may include:
a second STA affiliated to the non-AP MLD terminating the TXOP initiated by the second STA and/or ending the frame exchange prior to an EMLSR first transition delay before the start point of the first r-TWT SP, or the second STA affiliated to the non-AP MLD terminating the TXOP initiated by the second STA and/or ending the frame exchange prior to an EMLSR second transition delay before the start point of the first r-TWT SP, where the second STA is a station except for the first STA among the stations affiliated to the non-AP MLD, and the second STA is a station on the EMLSR link.

This example may be applicable to the case where the second STA is a transmission opportunity holder (TXOP Holder) before the first r-TWT SP starts.

Figure 4C:
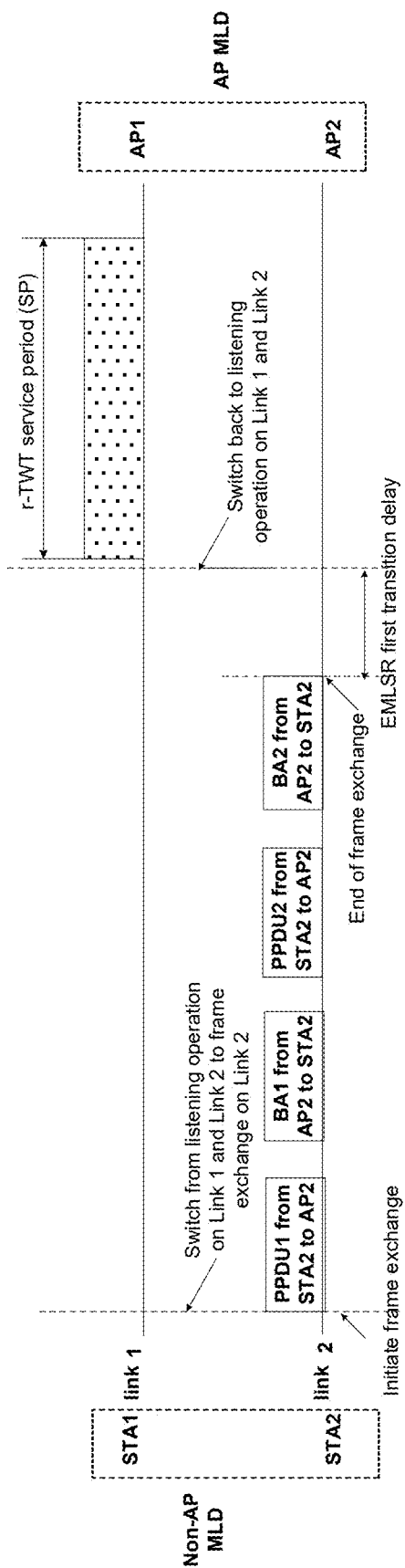
FIG. 4C is a schematic diagram showing yet another implementation for ensuring that a r-TWT scheduled station corresponding to a r-TWT SP enters a listening operation state before the r-TWT SP starts, in accordance with embodiments of the present application.

FIG. 4C is a schematic diagram of another implementation for ensuring that the r-TWT scheduled station corresponding to the r-TWT SP enters the listening operation state before the r-TWT SP starts, in accordance with embodiments of the present application. As shown in FIG. 4C, for another station (such as STA2 in FIG. 4C) of the non-AP MLD on the EMLSR link, if STA2 is the TXOP Holder before or no later than the start of the r-TWT service period on the link where STA1 is located, there is a need to ensure that STA2 terminates the TXOP initiated by STA2 or ends the frame exchange initiated by STA2 prior to an EMLSR first transition delay time before the start point of the r-TWT service period, so as to ensure that the station STA1 enters the listening operation state before the start of the r-TWT service period. The EMLSR first transition delay may represent the transition duration of the non-AP MLD operating in the EMLSR mode switching from the single link (e.g., Link 2 in FIG. 4C) frame exchange operation on the EMLSR link to the listening operation on the EMLSR link (e.g., Link 1 and Link 2 in FIG. 4C).

The value of the EMLSR first transition delay may be greater than or equal to 0.

In some implementations, the value of the EMLSR first transition delay may be sent by the non-AP MLD to the AP MLD when the non-AP MLD establishes multiple links with the AP MLD or when the non-AP MLD instructs the AP MLD to enter the EMLSR mode.

Figure 4D:
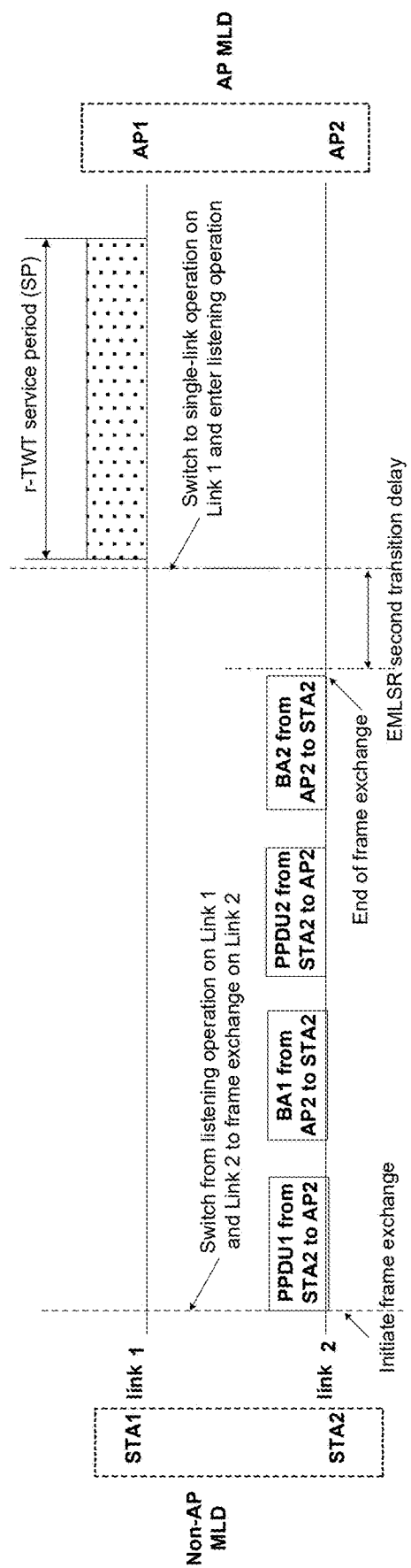
FIG. 4D is a schematic diagram showing still yet another implementation for ensuring that an r-TWT scheduled station corresponding to an r-TWT SP enters a listening operation state before the r-TWT SP starts, in accordance with embodiments of the present application.

FIG. 4D is a schematic diagram of another implementation for ensuring that the r-TWT scheduled station corresponding to the r-TWT SP enters the listening operation state before the r-TWT SP starts, in accordance with embodiments of the present application. As shown in FIG. 4D, for another station (e.g., STA2 in FIG. 4D) of the non-AP MLD on the EMLSR link, if STA2 is the TXOP Holder before the start of the r-TWT service period on the link where STA1 is located, there is a need to ensure that STA2 terminates the TXOP initiated by STA2 or ends the frame exchange initiated by STA2 prior to an EMLSR second transition delay time before the start point of the r-TWT service period, so as to ensure that the station STA1 enters the listening operation state before the start of the r-TWT service period. The EMLSR second transition delay may represent the transition duration of the non-AP MLD operating in the EMLSR mode switching from a single link (e.g., Link 2 in FIG. 4D) frame exchange operation on the EMLSR link to the operation on another link (e.g., Link 1 in FIG. 4D) in the EMLSR link.

In some implementations, the value of the EMLSR second transition delay may be greater than or equal to 0.

In some implementations, the value of the EMLSR second transition delay may be sent by the non-AP MLD to the AP MLD when the non-AP MLD establishes multiple links with the AP MLD or when the non-AP MLD instructs the AP MLD to enter the EMLSR mode.

In some implementations, the first MLD includes the non-AP MLD;
performing, by the first MLD, a first operation includes:
in response that frame exchange to be initiated by the second STA affiliated to the non-AP MLD overlaps with the first r-TWT SP in time, the second STA stopping or delaying initiating the frame exchange; or
in response that an end point of the frame exchange to be initiated by the second STA affiliated to the non-AP MLD is earlier than the start point of the first r-TWT SP, and a time interval between the end point of the frame exchange to be initiated by the second STA and the start point of the first r-TWT SP does not greater than the EMLSR first transition delay duration/EMLSR second transition delay duration, the second STA stopping or delaying initiating the frame exchange;

where the second STA is a station except for the first STA among the stations affiliated to the non-AP MLD, and the second STA is a station on the EMLSR link.

Figure 4E:
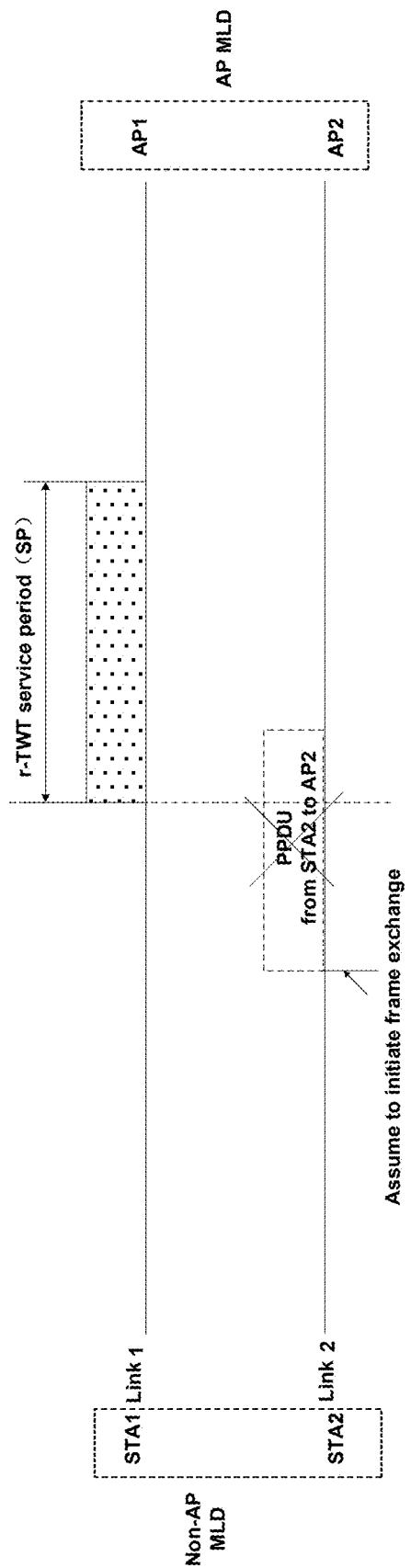
FIG. 4E is a schematic diagram showing still yet another implementation for ensuring that an r-TWT scheduled station corresponding to a r-TWT SP enters a listening operation state before the r-TWT SP starts, in accordance with embodiments of the present application.

FIG. 4E is a schematic diagram of another implementation for ensuring that the r-TWT scheduled station corresponding to the r-TWT SP enters the listening operation state before the r-TWT SP starts, in accordance with embodiments of the present application. As shown in FIG. 4E, for another station (e.g., STA2 in FIG. 4E) of the non-AP MLD on the EMLSR link, in response that the frame exchange to be initiated by STA2 overlaps in time with the r-TWT service period on the link where STA1 is located, STA2 stops or delays initiating the frame exchange.

Figure 4F:
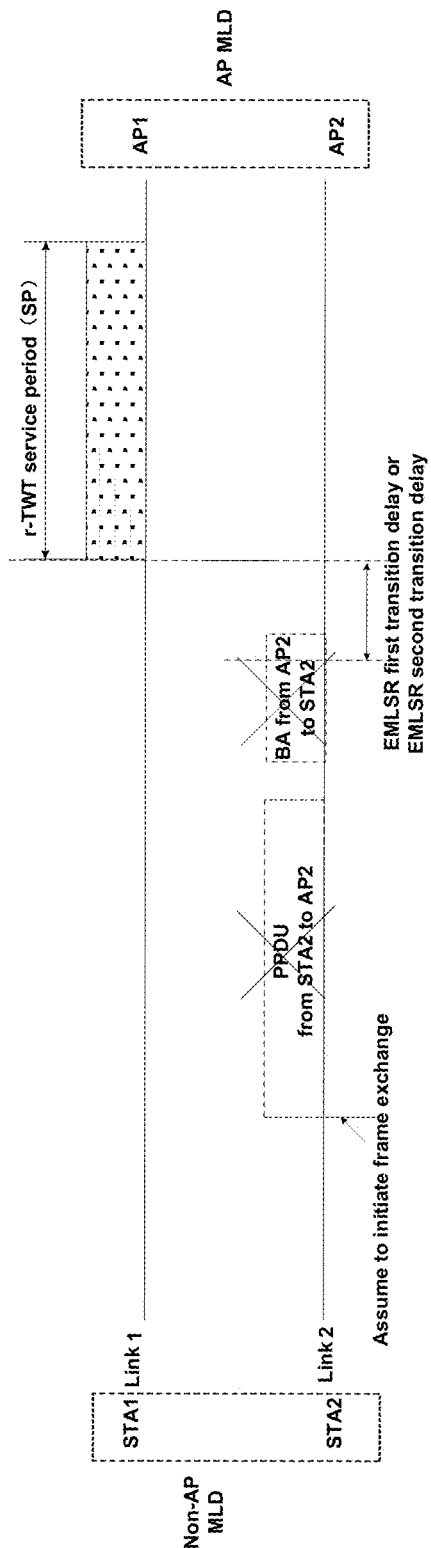
FIG. 4F is a schematic diagram showing still yet another implementation for ensuring that an r-TWT scheduled station corresponding to a r-TWT SP enters a listening operation state before the r-TWT SP starts, in accordance with embodiments of the present application.

FIG. 4F is a schematic diagram of another implementation for ensuring that the r-TWT scheduled station corresponding to the r-TWT SP enters the listening operation state before the r-TWT SP starts, in accordance with embodiments of the present application. As shown in FIG. 4F, for another station (e.g., STA2 in FIG. 4F) of the non-AP MLD on the EMLSR link, in response that the end point of the frame exchange to be initiated by STA2 is earlier than the start point of the r-TWT SP on the link where STA1 is located, and the time interval between the end point of the frame exchange to be initiated by STA2 and the start point of the r-TWT SP on the link where STA1 is located does not greater than the EMLSR first transition delay duration or the EMLSR second transition delay duration, STA2 stops or delays initiating the frame exchange. The relevant contents of the EMLSR first transition delay duration and the EMLSR second transition delay duration, may refer to the relevant contents in the above embodiments, and will not be repeated here.

In some implementations, the first MLD includes the non-AP MLD;

performing, by the first MLD, the first operation includes:
in response that the AP associated to the second STA affiliated to the non-AP MLD initiates a frame exchange with the second STA, and the frame exchange overlaps with the first r-TWT SP in time, the second STA does not responding to an initial control frame for initiating the frame exchange and transmitted by the AP associated to the second STA; or in response that the AP associated to the second STA affiliated to the non-AP MLD initiates a frame exchange with the second STA, the end point of the frame exchange is earlier than the start point of the first r-TWT SP, and the time interval between the end point of the frame exchange and the start point of the first r-TWT SP does not greater than the EMLSR first transition delay duration/EMLSR second transition delay duration, the second STA does not responding to the initial control frame that is used for initiating the frame exchange and transmitted by the AP associated to the second STA;

where the second STA is a station except for the first STA among the stations affiliated to the non-AP MLD, and the second STA is a station on the EMLSR link.

Figure 4G:
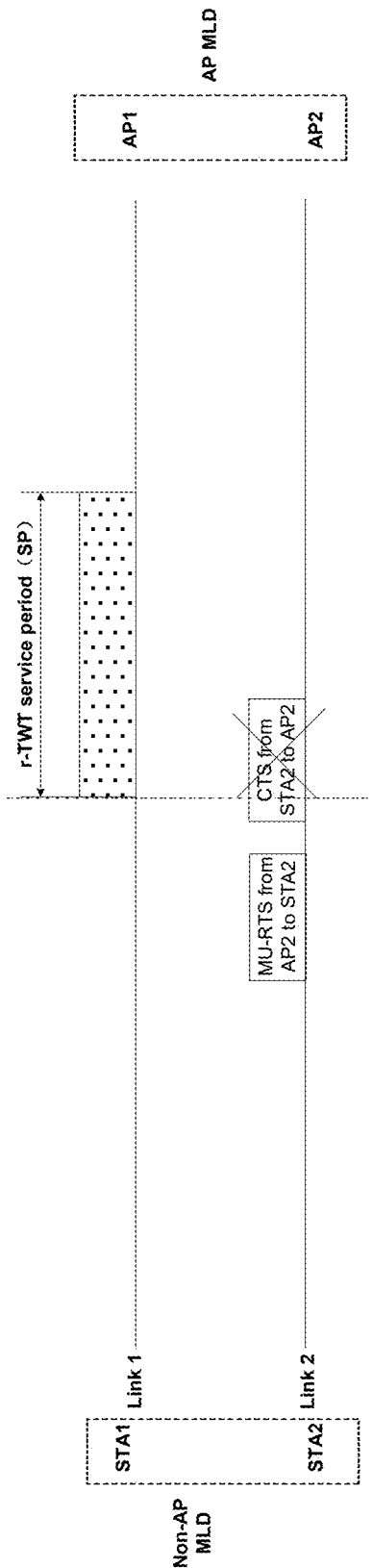
FIG. 4G is a schematic diagram showing still yet another implementation for ensuring that an r-TWT scheduled station corresponding to an r-TWT SP enters a listening operation state before the r-TWT SP starts, in accordance with embodiments of the present application.

FIG. 4G is a schematic diagram of another implementation for ensuring that the r-TWT scheduled station corresponding to the r-TWT SP enters the listening operation state before the r-TWT SP starts, in accordance with embodiments of the present application. As shown in FIG. 4G, for another station (e.g., STA2 in FIG. 4G) of the non-AP MLD on the EMLSR link, in response that an AP2 associated to STA2 initiates a frame exchange with STA2, and the frame exchange overlaps in time with the r-TWT service period on the link where STA1 is located, the STA2 does not respond to an initial control frame transmitted by AP2 used for initiating the frame exchange.

Figure 4H:
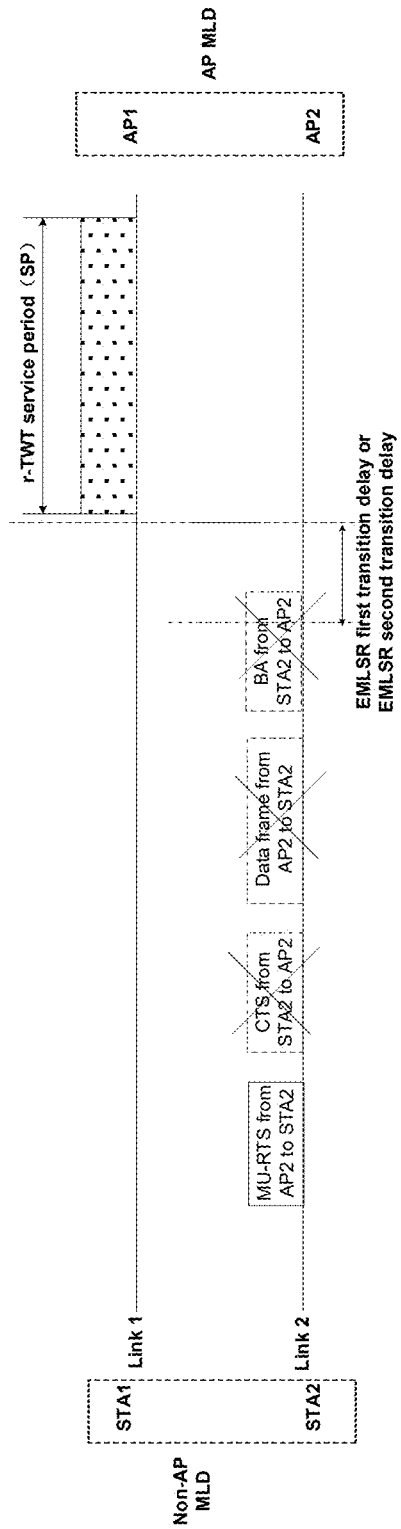
FIG. 4H is a schematic diagram showing still yet another implementation for ensuring that an r-TWT scheduled station corresponding to an r-TWT SP enters a listening operation state before the r-TWT SP starts, in accordance with embodiments of the present application.

FIG. 4H is a schematic diagram of another implementation for ensuring that the r-TWT scheduled station corresponding to the r-TWT SP enters the listening operation state before the r-TWT SP starts, in accordance with embodiments of the present application. As shown in FIG. 4H, for another station (e.g., STA2 in FIG. 4H) of the non-AP MLD on the EMLSR link, in response that an AP2 associated to the STA2 initiates a frame exchange with the STA2, an end point of the frame exchange is earlier than a start point of the r-TWT service period on the link where the STA1 is located, and the time interval between the end point of the frame exchange and the start point of the r-TWT service period on the link where STA1 is located does not greater than the EMLSR first transition delay duration or the EMLSR second transition delay duration, the STA2 does not respond to an initial control frame transmitted by the AP2 used for initiating the frame exchange. The relevant contents of the EMLSR first transition delay duration and the EMLSR second transition delay duration may refer to the relevant contents in the above embodiments, and will not be repeated here.

Since the STA2 does not respond to the initial control frame of the frame exchange initiated by the AP2, the non-AP MLD operating in the EMLSR mode will not enter a single link (e.g., Link 2 in FIGS. 4G and 4H) frame exchange operation state in the EMLSR link. Therefore, there is on effect on a case that the STA1 enters the listening operation state before the start point of the r-TWT service period on the link where the STA1 is located.

In some implementations, the first MLD may include an AP MLD associated to the non-AP MLD;

performing, by the first MLD, the first operation may include:
a first AP affiliated to the AP MLD terminating TXOP initiated by the first AP and/or ending the frame exchange prior to a timeout interval before the start point of the first r-TWT SP, or the first AP affiliated to the AP MLD terminating the TXOP initiated by the first AP and/or ending the frame exchange at a time earlier than a sum of the EMLSR first transition delay and the timeout interval before the start point of the first r-TWT SP, where the first STA is associated to the first AP.

This example may be applicable to a case where the first STA performs frame exchange with an associated AP (e.g., AP1) of the AP MLD before the first r-TWT SP starts and the frame exchange is initiated by the AP1.

Figure 4I:
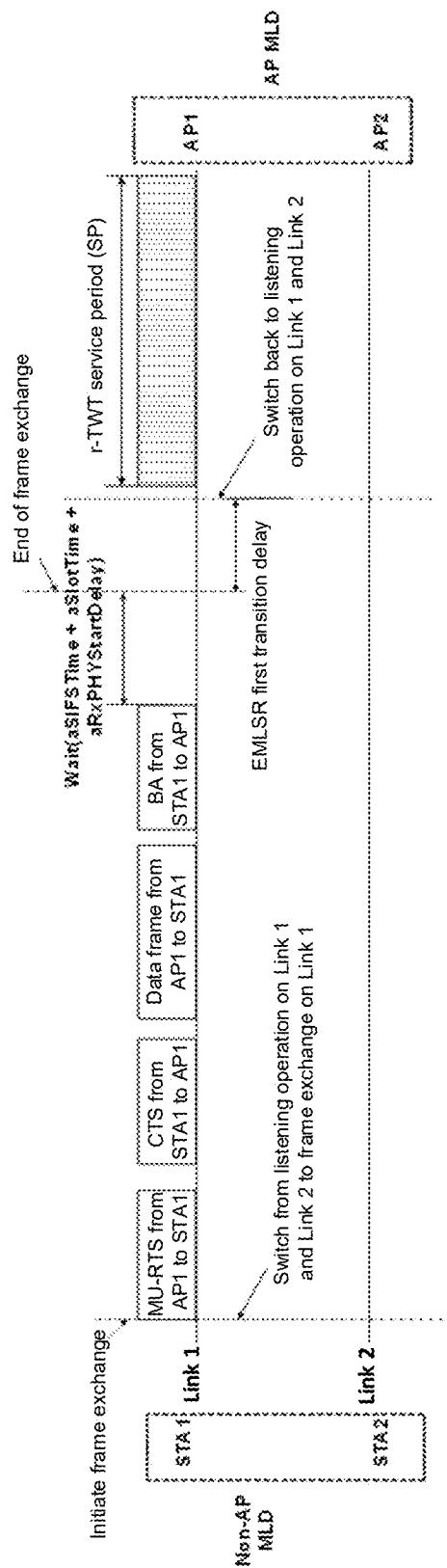
FIG. 4I is a schematic diagram showing still yet another implementation for ensuring that an r-TWT scheduled station corresponding to a r-TWT SP enters a listening operation state before the r-TWT SP starts, in accordance with embodiments of the present application.

FIG. 4I is a schematic diagram of another implementation for ensuring that the r-TWT scheduled station corresponding to the r-TWT SP enters the listening operation state before the r-TWT SP starts, in accordance with embodiments of the present application. As shown in FIG. 4I, in response that the station STA1 performs frame exchange with an associated AP (e.g., AP1 in FIG. 4I) of the AP MLD before the start of the r-TWT service period, and the frame exchange is initiated by the AP1, there is a need to ensure that the AP MLD (AP1 affiliated to the AP MLD as shown in FIG. 4I) terminates the frame exchange with the STA1 or terminates the TXOP prior to an EMLSR first transition delay before the start point of the r-TWT service period, so as to ensure that the STA1 enters the listening operation state before the start of the r-TWT service period; in addition, in order for STA1 to be able to determine the end of the frame exchange, there is a need to ensure that after AP1 receives the last PPDU end time sent by STA1, the duration left for STA1 is greater than or equal to the timeout interval to determine the end of the frame exchange. Therefore, AP1 needs to terminate the TXOP initiated by AP1 and/or end the frame exchange prior to a sum of the EMLSR first transition delay and the timeout interval before the start point of the r-TWT service period.

The EMLSR first transition delay may represent the transition duration of the non-AP MLD operating in the EMLSR mode switching from a single link (e.g., Link 1 shown in FIG. 4I) frame exchange operation on the EMLSR link to the listening operation on the EMLSR link (e.g., Link 1 and Link 2 in FIG. 4I).

In some implementations, the timeout interval may be equal to a sum of aSIFSTime, aSlotTime, and aRxPHYStartDelay, where the aSIFSTime represents a time nominally required for the medium access control (MAC) and the physical layer (PHY) to receive the last symbol or process frame of a frame from a wireless medium (WM) and respond to a first symbol of an earliest possible response frame on the WM;

the aSlotTime may represent a time slot for MAC to define an interframe space (IFS); and the aRxPHYStartDelay may represent a delay from start of a physical layer protocol data unit (PPDU) of a receiver antenna to issuance of a physical layer-receive start indication (PHY-RXSTART.indication) primitive.

As shown in FIG. 4I, STA1 determines the end of the frame exchange after a timeout interval after the sent end point of the last PPDU, and then non-AP MLD switches to the listening operation on Link 1 and Link 2 after an EMLSR first transition delay, so that STA1 enters the listening operation before the start point of the r-TWT service period.

Figure 4J:
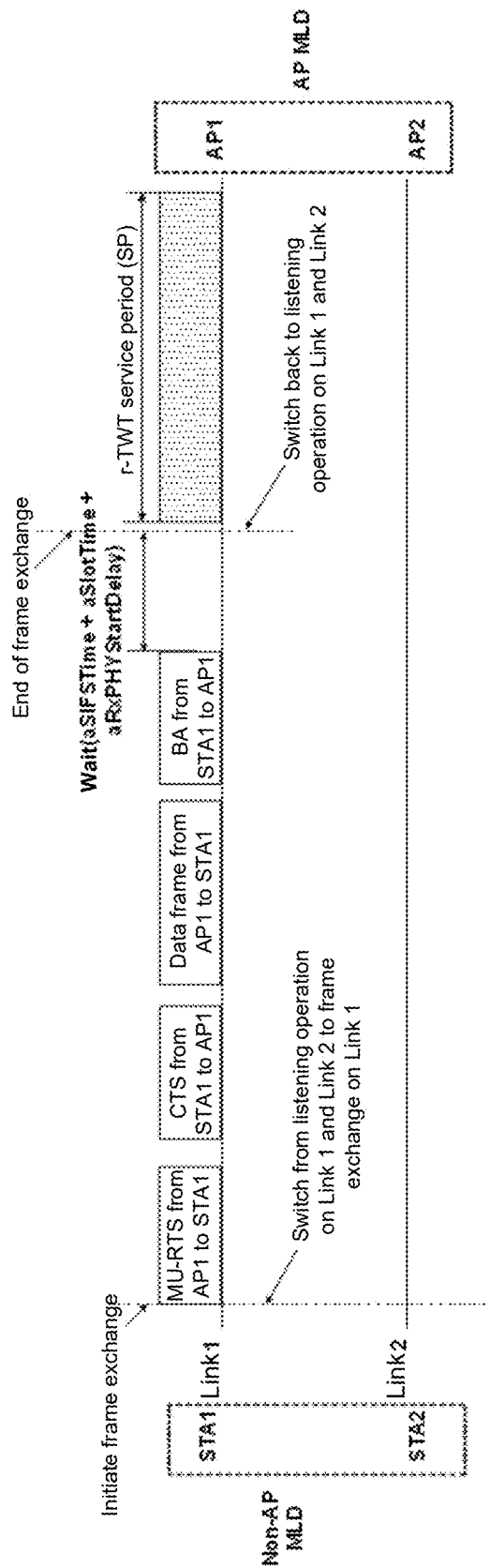
FIG. 4J is a schematic diagram showing still yet another implementation for ensuring that an r-TWT scheduled station corresponding to a r-TWT SP enters a listening operation state before the r-TWT SP starts, in accordance with embodiments of the present application.

FIG. 4J is a schematic diagram of another implementation for ensuring that the r-TWT scheduled station corresponding to the r-TWT SP enters the listening operation state before the r-TWT SP starts, in accordance with embodiments of the present application. As shown in FIG. 4J, in a case where the station STA1 performs frame exchange with an associated AP (such as AP1 in FIG. 4J) of the AP MLD before the start of the r-TWT service period, and the frame exchange is initiated by AP1, there is a need to ensure that the AP MLD (AP1 affiliated to the AP MLD as shown in FIG. 4J) terminates the frame exchange with STA1 or terminates the TXOP before the start point of these r-TWT service periods under a case that STA1 does not switch to the listening operation on the EMLSR link (e.g., Link 1 and Link 2 in FIG. 4J); in addition, in order for STA1 to be able to determine the end of the frame exchange, there is a need to ensure that after AP1 receives the last PPDU end time sent by STA1, the duration left for STA1 is greater than or equal to the timeout interval to determine the end of the frame exchange. Therefore, AP1 needs to terminate the TXOP initiated by AP1 and/or end the frame exchange prior to a timeout interval before the start point of the r-TWT service period.

In the above, the timeout interval may be equal to a sum of aSIFSTime, aSlotTime and aRxPHYStartDelay, where the aSIFSTime represents a time nominally required for MAC and the physical layer (PHY) to receive the last symbol or process frame of a frame from a WM and respond to a first symbol of an earliest possible response frame on the WM;

the aSlotTime may represent a time slot for MAC to define IFS; and the aRxPHYStartDelay may represent a delay from start of a PPDU of a receiver antenna to issuance of a physical layer-receive start indication (PHY-RXSTART.indication) primitive.

As shown in FIG. 4J, STA1 determines the end of the frame exchange after a timeout interval after the sent end point of the last PPDU, and then maintains the operation on the single link (e.g., Link 1 in FIG. 4J) and enters the listening operation.

In some implementations, the first MLD includes an AP MLD associated to a non-AP MLD;

performing, by the first MLD, the first operation may include:

a second AP affiliated to the AP MLD terminating the TXOP initiated by the second AP and/or ending the frame exchange prior to a sum of the EMLSR first transition delay and the timeout interval before the start point of the first r-TWT SP, or the second AP affiliated to the AP MLD terminating the TXOP initiated by the second AP and/or ending the frame exchange prior to the sum of the EMLSR second transition delay and the timeout interval before the start point of the first r-TWT SP, where the second AP is associated to a second STA, the second STA is a station except for the first STA among the stations affiliated to non-AP MLD, and the second STA is a station on the EMLSR link.

This example may be applicable to the case where the second STA performs frame exchange with an associated AP (e.g., AP2) of the AP MLD before the first r-TWT SP starts, and the frame exchange is initiated by the AP2.

Figure 4K:
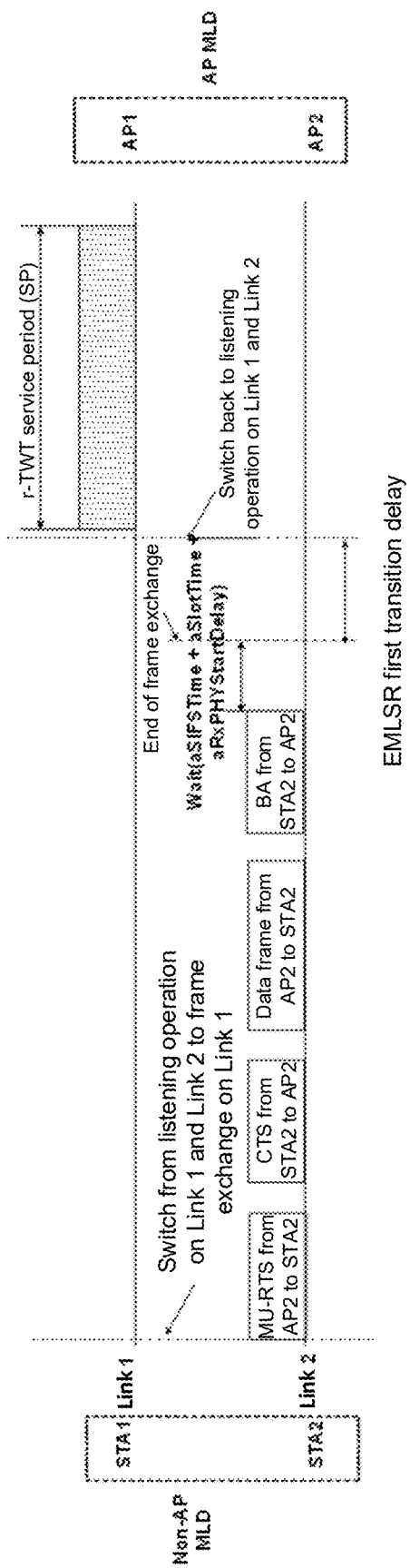
FIG. 4K is a schematic diagram showing still yet another implementation for ensuring that an r-TWT scheduled station corresponding to an r-TWT SP enters a listening operation state before the r-TWT SP starts, in accordance with embodiments of the present application.

FIG. 4K is a schematic diagram of another implementation for ensuring that the r-TWT scheduled station corresponding to the r-TWT SP enters the listening operation state before the r-TWT SP starts, in accordance with embodiments of the present application. As shown in FIG. 4K, for another station (e.g., STA2 in FIG. 4K) of the non-AP MLD on the EMLSR link, in response that STA2 performs frame exchange with an associated AP (e.g., AP2 in FIG. 4K) affiliated to the AP MLD before or no later than the start of the r-TWT service period on the link where STA1 is located, and the frame exchange is initiated by AP2, there is a need to ensure that the AP MLD (for example, it may be AP2 affiliated to the AP MLD) terminates the frame exchange with STA2 or terminates the TXOP prior to an EMLSR first transition delay duration before or no later than the start point of the r-TWT service period, so as to ensure that the STA1 enters the listening operation state before the start of the r-TWT service period; in addition, in order for STA2 to be able to determine the end of the frame exchange, there is a need to ensure that after AP2 receives the last PPDU end time sent by STA2, the duration left for STA2 is greater than or equal to the timeout interval (timeout interval) to determine the end of the frame exchange. Therefore, AP2 needs to terminate the TXOP initiated by AP2 and/or end the frame exchange prior to a sum of the EMLSR first transition delay and the timeout interval before or no later than the start point of the r-TWT service period.

The EMLSR first transition delay may represent the transition duration of the non-AP MLD operating in the EMLSR mode switching from a single link (e.g., Link 2 in FIG. 4K) frame exchange operation on the EMLSR link to the listening operation on the EMLSR link (e.g., Link 1 and Link 2 in FIG. 4K).

The timeout interval may be equal to a sum of aSIFSTime, aSlotTime and aRxPHYStartDelay, where the aSIFSTime represents a time nominally required for MAC and the physical layer (PHY) to receive the last symbol or process frame of a frame from a WM and respond to a first symbol of an earliest possible response frame on the WM;

the aSlotTime may represent a time slot for MAC to define IFS; and the aRxPHYStartDelay may represent a delay from start of a PPDU of a receiver antenna to issuance of a physical layer-receive start indication (PHY-RXSTART.indication) primitive.

As shown in FIG. 4K, STA2 determines the end of the frame exchange after a timeout interval after the sent end point of the last PPDU, and then non-AP MLD switches to the listening operation on Link 1 and Link 2 after an EMLSR first transition delay, so that STA1 enters the listening operation before the start point of the r-TWT service period.

Figure 4L:
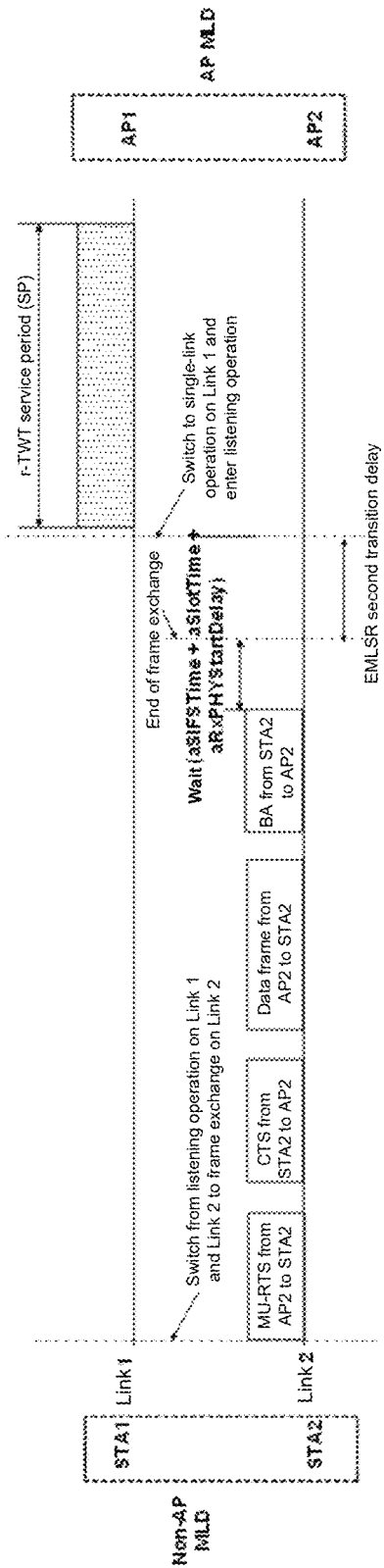
FIG. 4L is a schematic diagram showing still yet another implementation for ensuring that an r-TWT scheduled station corresponding to an r-TWT SP enters a listening operation state before the r-TWT SP starts, in accordance with embodiments of the present application.

FIG. 4L is a schematic diagram of another implementation for ensuring that the r-TWT scheduled station corresponding to the r-TWT SP enters the listening operation state before the r-TWT SP starts, in accordance with embodiments of the present application. As shown in FIG. 4L, for another station (e.g., STA2 in FIG. 4L) of the non-AP MLD on the EMLSR link, in response that STA2 performs frame exchange with an associated AP (e.g., AP2 in FIG. 4L) affiliated to the AP MLD before the start of the r-TWT service period on the link where STA1 is located, and the frame exchange is initiated by AP2, there is a need to ensure that the AP MLD (for example, it may be AP2 affiliated to the AP MLD) terminates the frame exchange with STA2 or terminates the TXOP prior to an EMLSR second transition delay duration before the start point of the r-TWT service period, so as to ensure that the STA1 enters the listening operation state before the start of the r-TWT service period; in addition, in order for STA2 to be able to determine the end of the frame exchange, there is a need to ensure that after AP2 receives the last PPDU end time sent by STA2, the duration left for STA2 is greater than or equal to the timeout interval (timeout interval) to determine the end of the frame exchange. Therefore, AP2 needs to terminate the TXOP initiated by AP2 and/or end the frame exchange prior to a sum of the EMLSR second transition delay and the timeout interval before the start point of the r-TWT service period.

The EMLSR second transition delay may represent the transition duration of the non-AP MLD operating in the EMLSR mode switching from a single link (e.g., Link 2 in FIG. 4L) frame exchange operation on the EMLSR link to the operation on another link (e.g., Link 1 in FIG. 4L) of the EMLSR link, and after the switch, the listening operation is only performed on Link 1 and no listening operation is performed on Link 2.

The timeout interval may be equal to a sum of aSIFSTime, aSlotTime and aRxPHYStartDelay, where the aSIFSTime represents a time nominally required for MAC and the physical layer (PHY) to receive the last symbol or process frame of a frame from a WM and respond to a first symbol of an earliest possible response frame on the WM;

the aSlotTime may represent a time slot for MAC to define IFS; and the aRxPHYStartDelay may represent a delay from start of a PPDU of a receiver antenna to issuance of a physical layer-receive start indication (PHY-RXSTART.indication) primitive.

As shown in FIG. 4L, STA2 determines the end of the frame exchange after a timeout interval after the sent end point of the last PPDU, and then non-AP MLD switches to the single-link operation on Link 1 and enters the listening operation after the EMLSR second transition delay, so that STA1 enters the listening operation before the start point of the r-TWT service period.

In the implementations of the present application, the EMLSR first transition delay and the EMLSR second transition delay may be the same or different.

Several operation methods for the EMLSR link before the start point of the r-TWT service period are described in the above implementations. In a case where a non-AP MLD is associated to an AP MLD supporting the EMLSR mode, and operates in the EMLSR mode on the EMLSR link, if a station of the non-AP MLD on the EMLSR link has established an r-TWT with an AP associated to the AP MLD and is the r-TWT scheduled station of a specific r-TWT service period, then any of the implementations in the above embodiments and other similar implementations may be adopted to ensure that the station is in a listening operation state before these r-TWT service periods start. The present application does not list all the implementations for ensuring that the station is in the listening operation state before these r-TWT service periods start, and the implementations are not limited to the several implementations described in the above embodiments.

Embodiments of the present application further provide a communication method. FIG. 5 is a schematic flowchart of a communication method 500, in accordance with an embodiment of the present application. The method may optionally be applied to the system shown in FIG. 1, but is not limited thereto. The method includes at least part of the following.

In S510, a second MLD performs a second operation, the second operation being used to cause or preferentially cause a third STA affiliated to a non-AP MLD to be in a listening operation state or frame exchange operation state during a second r-TWT SP, where the third STA is an r-TWT scheduled station corresponding to the second r-TWT SP.

In some implementations, the second MLD performing the second operation, the second operation being used to cause or preferentially cause the third STA affiliated to the non-AP MLD to be in the listening operation state or the frame exchange operation state during the second r-TWT SP may include: the second MLD ensuring or preferentially ensuring that the third STA affiliated to the non-AP MLD is in the listening operation state or the frame exchange operation state during the second r-TWT SP.

In some implementations, the non-AP MLD is associated to the AP MILD, the third STA affiliated to the non-AP MLD is associated to the third AP affiliated to the AP MLD, the third STA establishes an r-TWT with the third AP, and the third STA is a r-TWT scheduled station corresponding to the second r-TWT SP.

The second MLD may be a non-AP MLD or an AP MLD associated to the non-AP MLD; that is, the non-AP MLD or the AP MLD associated to the non-AP MLD ensures that the third STA affiliated to the non-AP MLD is in the listening operation state or the frame exchange operation state during the second r-TWT SP. In the following embodiments, implementations for the case where the second MLD is a non-AP MLD or an AP MLD associated to the non-AP MLD will be described separately.

The non-AP MLD may operate in the EMLSR mode, and accordingly, the third STA is a station on the EMLSR link; alternatively, the non-AP MLD may operate in the EMLMR mode, and accordingly, the third STA is a station on the EMLMR link.

The following description will be made by taking an example in which the non-AP MLD operates in the EMLSR mode.

Considering an example in which the non-AP MLD operates in the EMLSR mode, the embodiments of the present application relate to the operation mode of the EMLSR link during the r-TWT SP.

In an example, the non-AP MLD is associated to an AP MLD after a multi-link establishment process, where there are two links, namely Link 1 and Link 2. In a case where the non-AP MLD and the AP MLD support the EMLSR mode, and the non-AP MLD operates in the EMLSR mode on the EMLSR link (Link 1 and Link 2), a station (e.g., STA1) of the non-AP MLD on the EMLSR link establishes an r-TWT with an AP (such as AP1) associated to the AP MLD, and the station is the r-TWT scheduled station of a specific r-TWT service period, then there is a need to ensure that the STA1 is in the listening operation or frame exchange operation during the r-TWT service period, and/or preferentially ensure that the STA1 is in the listening operation or frame exchange operation during the r-TWT service period.

In some implementations, the listening operation state includes at least one of the following:
performing clear channel assessment (CCA); or
being able to receive an initial control frame of a frame exchange sequence sent by the AP MLD.

In some implementations, the frame exchange operation includes a frame exchange initiated by STA1 or a frame exchange initiated by an AP associated to the AP MLD.

In some implementations, the second MLD includes the non-AP MLD;
the second MLD performing the second operation may include:
forbidding, by the non-AP MLD, a fourth STA to acquire TXOP through channel access contention during a period overlapping with a second r-TWT SP, where the fourth STA is a station except for the third STA among the stations affiliated to the non-AP MLD, and the fourth STA is a station on the EMLSR link.

In some implementations, the manner of the channel access may be enhanced distributed channel access (EDCA).

Figure 6A:
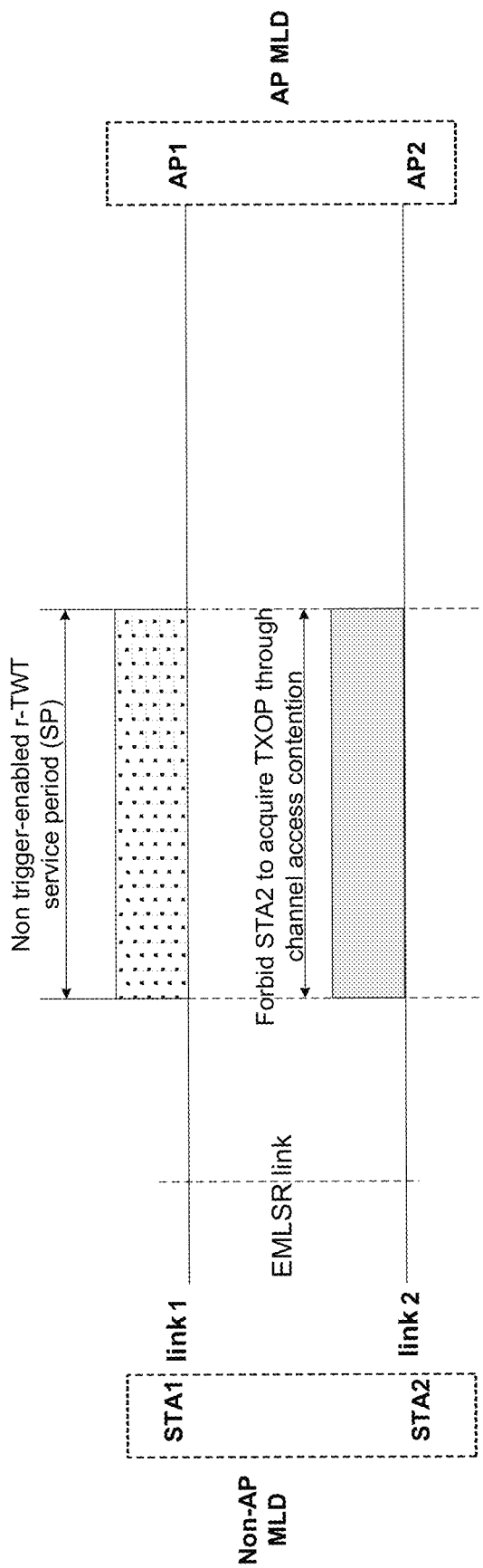
FIG. 6A is a schematic diagram showing an operation mode during an r-TWT service period on an EMLSR link, in accordance with embodiments of the present application.

FIG. 6A is a schematic diagram showing an operation mode during an r-TWT service period on an EMLSR link, in accordance with embodiments of the present application. As shown in FIG. 6A, for another station (e.g., STA2 in FIG. 6A) of the non-AP MLD on the EMLSR link, during the r-TWT service period corresponding to STA1, in order to ensure that STA1 is in the listening operation or frame exchange operation during the r-TWT service period, STA2 is forbidden to initiate frame exchange by acquiring TXOP through channel access contention. As shown in FIG. 6A, in response that the r-TWT service period scheduled by STA1 as the r-TWT scheduled station on Link 1 is a non trigger-enabled r-TWT service period, STA2 is forbidden to initiate frame exchange by acquiring TXOP through channel access contention during the period overlapping with the r-TWT service period on Link 2. The manner of channel access may be the EDCA.

In some implementations, the second MLD includes a non-AP MLD;
the second MLD performing the second operation may include:
allowing, by the non-AP MLD, the fourth STA to acquire TXOP through channel access in a contention manner during the period overlapping with the second r-TWT SP, and a chance for the fourth STA to acquire TXOP through channel access contention during the period overlapping with the second r-TWT SP being smaller than a chance for the third STA to acquire TXOP through channel access contention during the second r-TWT SP, where the fourth STA is a station except for the third STA among the stations affiliated to the non-AP MLD, and the fourth STA is a station on the EMLSR link.

In some implementations, the manner of channel access may be EDCA.

In some embodiments, the chance for the fourth STA to acquire TXOP through channel access contention during the period overlapping with the second r-TWT SP being smaller than the chance for the third STA to acquire TXOP through channel access contention during the second r-TWT SP may include:
a priority level of an EDCA parameter set used by the fourth STA for channel access contention during the period overlapping with the second r-TWT SP being lower than that of an EDCA parameter set used by the third STA for channel access contention during the second r-TWT SP.

Figure 6B:
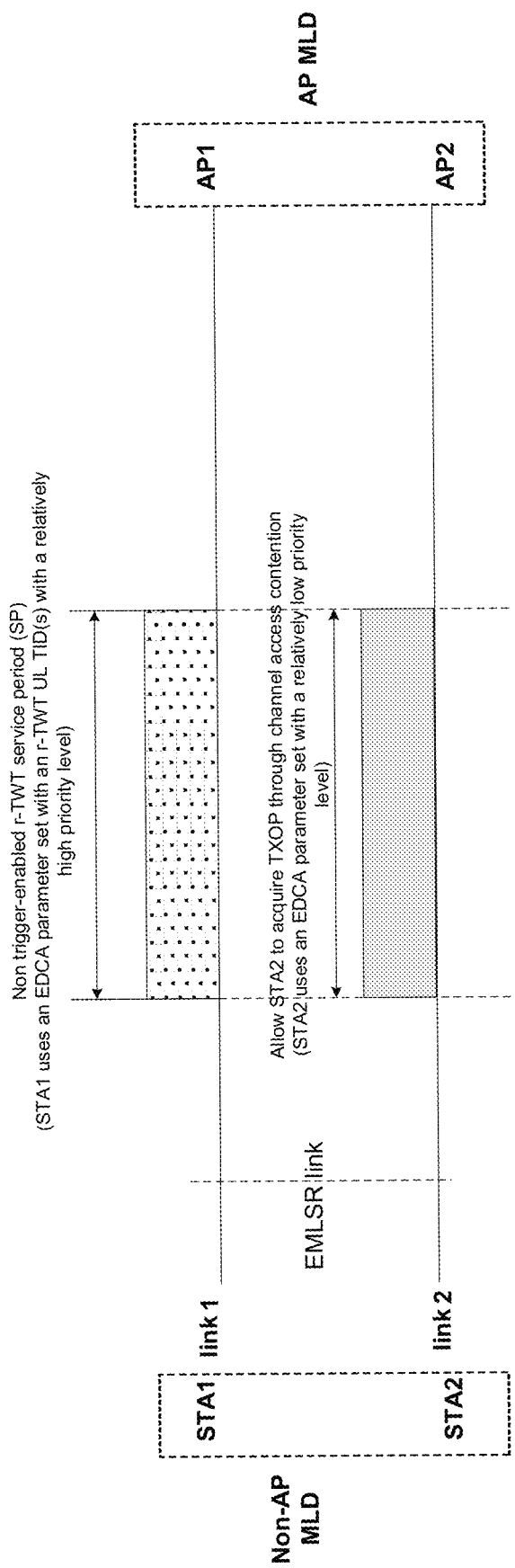
FIG. 6B is a schematic diagram showing another operation mode during an r-TWT service period on an EMLSR link, in accordance with embodiments of the present application.

FIG. 6B is a schematic diagram showing another operation mode during an r-TWT service period on an EMLSR link, in accordance with embodiments of the present application. As shown in FIG. 6B, STA2 is allowed to initiate a frame exchange by acquiring TXOP through channel access contention, and a chance for STA2 to acquire TXOP through channel access contention is reduced, so that it is preferentially ensured that an MAC protocol data unit (MPDU) or aggregate MAC protocol data unit (A-MPDU) corresponding to the r-TWT UL TID of STA1 preferentially perform channel accessing. For example, for a non trigger-enabled r-TWT service period, it is ensured that STA1 has priority to compete for channel access chance to perform frame exchange operation relative to other stations (e.g., STA2 in FIG. 6B) of the non-AP MLD on the EMLSR link during the r-TWT service period. In some embodiments, the priority level of the EDCA parameter set used by STA1 during the r-TWT service period may be made higher than the priority level of the EDCA parameter set used by STA2 to ensure that the MPDU or A-MPDU corresponding to the r-TWT UL TID of STA1 has priority in channel access. The r-TWT UL TID may refer to an r-TWT uplink stream identifier determined when STA1 establishes an r-TWT with an AP (e.g., AP1 in FIG. 6B) associated to the AP MLD.

In some implementations, the second MLD includes an AP MLD associated to the non-AP MLD;
the second MLD performing the second operation may include:
forbidding, by the AP MLD, a fourth AP to initiate frame exchange with a fourth STA during the second r-TWT SP; or
a time interval during which the fourth AP affiliated to the AP MLD initiates a frame exchange with the fourth STA does not overlapping with the second r-TWT SP;
where the fourth AP is associated to the fourth STA, the fourth STA is a station except for the third STA among the stations affiliated to the non-AP MLD, and the fourth STA is a station on the EMLSR link.

Figure 6C:
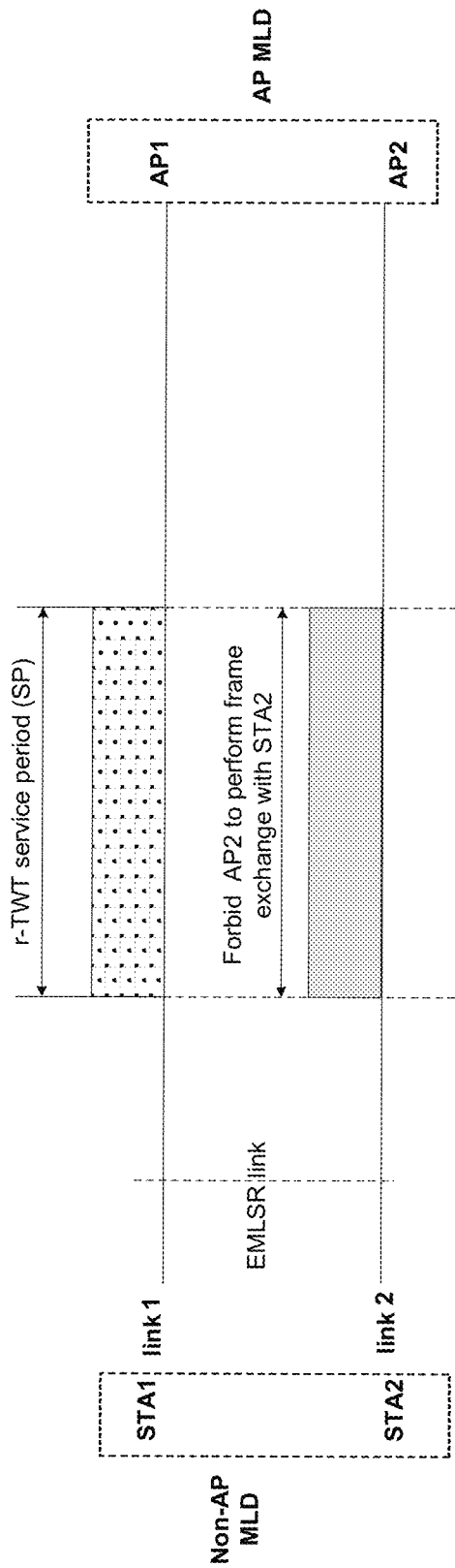
FIG. 6C is a schematic diagram showing yet another operation mode during a r-TWT service period on an EMLSR link, in accordance with embodiments of the present application.

FIG. 6C is a schematic diagram showing another operation mode during the r-TWT service period on the EMLSR link, in accordance with embodiments of the present application. As shown in FIG. 6C, for another station (e.g., STA2 in FIG. 6C) of the non-AP MLD on the EMLSR link, during an r-TWT service period corresponding to STA1, an AP (e.g., AP2 in FIG. 6C) associated to STA2 of the AP MLD does not initiate a frame exchange with STA2, or a time interval during which AP2 initiates a frame exchange with STA2 does not overlap with the r-TWT service period on Link 1, so as to ensure that STA1 is in the listening operation or frame exchange operation during the r-TWT service period.

Several operation methods for the EMLSR link during the r-TWT service period are described in the above implementations. In a case where a non-AP MLD is associated to an AP MLD supporting the EMLSR mode, it is ensured that STA1 is in the listening operation or frame exchange operation during the r-TWT service period, or it is ensured that STA1 has priority to compete for channel access chance to perform frame exchange operation relative to other stations (e.g., STA2) of the non-AP MLD on the EMLSR link during the r-TWT service period, which includes that the priority level of the EDCA parameters used by STA1 during the trigger-enabled r-TWT service period is higher than the priority level of the EDCA parameters used by STA2. The present application does not list all the implementations for ensuring that STA1 is or is preferentially in the listening operation state or frame exchange operation state during the r-TWT service period, and the implementations are not limited to the several implementations described in the above embodiments.

Embodiments of the present application further provide a communication method. FIG. 7 is a schematic flowchart of a communication method 700, in accordance to embodiments of the present application. The method may optionally be applied to the system shown in FIG. 1, but is not limited thereto. The method includes at least part of the following.

In S710, an AP MILD performs a third operation, where the third operation is used to make r-TWT SPs separately scheduled on two or more links do not overlap in time.

In some implementations, the above method may be: the AP MLD ensuring that the r-TWT SPs separately scheduled on two or more links do not overlap in time.

The above-mentioned link may include an EMLSR link or an EMLMR link. The following will be described by taking an example in which the link is the EMLSR link, and the AP MLD and non-AP MLD employ the EMLSR mode.

In some implementations, the above-mentioned AP MLD is associated to the non-AP MLD, the non-AP MLD associated to the AP MLD employ the EMLSR mode, and two affiliated stations (STA) of the non-AP MLD on the EMLSR link are the r-TWT scheduled stations corresponding to the scheduled r-TWT SP.

In some implementations, the AP MLD performing the third operation may include:
 causing, by the AP MLD, a time interval between an end time of the third r-TWT SP and a start time of the fourth r-TWT SP to be greater than or equal to an EMLSR first transition delay, where the third r-TWT SP and the fourth r-TWT SP are on different links.

In some implementations, the above-mentioned EMLSR first transition delay may represent a transition duration of the non-AP MLD operating in the EMLSR mode switching from a single-link frame exchange operation on the EMLSR link to the listening operation on the EMLSR link.

The value of the EMLSR first transition delay may be greater than or equal to 0.

In some implementations, the value of the EMLSR first transition delay may be sent by the non-AP MLD to the AP MLD when the non-AP MLD establishes multiple links with the AP MLD or when the non-AP MLD instructs the AP MLD to enter the EMLSR mode.

Figure 8A:
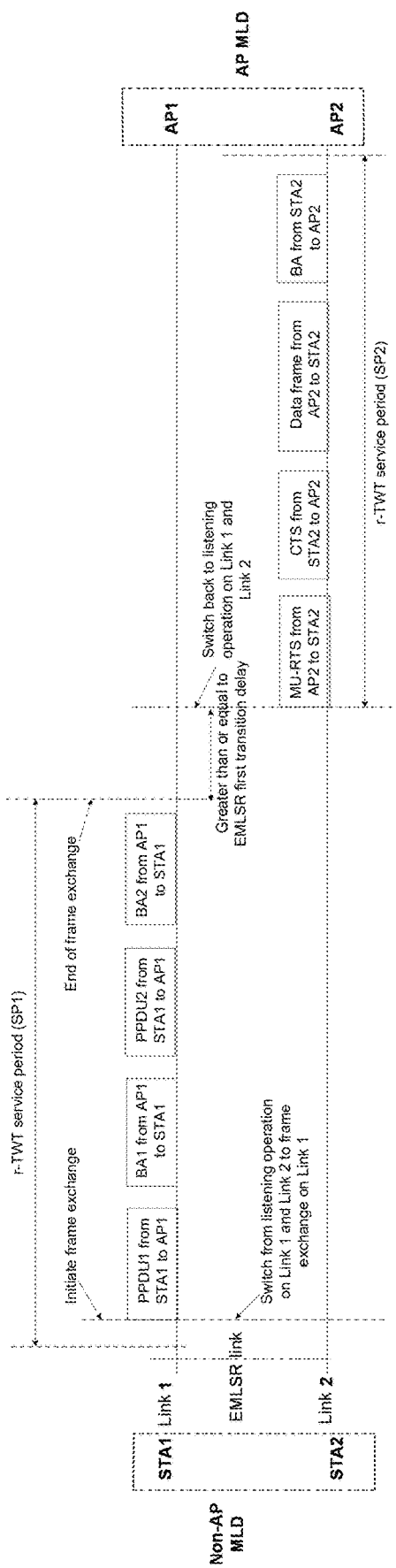
FIG. 8A is a schematic diagram showing an operation mode for a case where r-TWT service periods exist on multiple links of an EMLSR link, in accordance with embodiments of the present application.

FIG. 8A is a schematic diagram showing an operation mode for a case where r-TWT service periods exist on multiple links of an EMLSR link, in accordance with an embodiment of the present application. As shown in FIG. 8A, the non-AP MLD is associated to the AP MLD after the multi-link establishment process, there are two links for the non-AP MLD to establish connection with the AP MLD, such as Link 1 and Link 2 in FIG. 8A. For the non-AP MLD and AP MLD, by means of stream identifier to link mapping (TID-To-Mapping), TID 1 is mapped to Link 1 in a downlink direction, and TID 2 is mapped to Link 2 in an uplink direction. AP MLD and non-AP MLD establishing r-TWTs on corresponding links includes: AP1 affiliated to AP MLD establishing an r-TWT on Link 1 and determining TID 1 as an r-TWT uplink TID (r-TWT UL TID), STA1 being the r-TWT scheduled station and configured to send uplink low-latency service streams on an r-TWT service period (e.g., SP1 in FIG. 8A); AP2 establishing an r-TWT on Link 2, STA2 being the r-TWT scheduled station, and TID 2 being determined as the r-TWT downlink TID (r-TWT DL TID), and configured to send downlink low-latency service streams on an r-TWT service period (e.g., SP2 in FIG. 8A). In the above, SP2 is a trigger-enabled r-TWT service period. The time interval between the end time of the r-TWT service period (SP1) on Link 1 and the start time of the adjacent r-TWT service period (SP2) on Link 2 needs to be greater than or equal to the EMLSR first transition delay to ensure that after the frame exchange performed within the r-TWT service period on the current Link 1 is ended, the non-AP MLD has enough time to enter the listening operation before the start point of the r-TWT service period on Link 2. The EMLSR first transition delay may represent the transition duration of the non-AP MLD operating in the EMLSR mode switching from the single-link (e.g., Link 1 in FIG. 8A) frame exchange operation on the EMLSR link to the listening operation on the EMLSR link (e.g., Link 1 and Link 2 in FIG. 8A).

In some implementations, the AP MLD performing the third operation may include:
 causing, by the AP MLD, a time interval between the end point of the third r-TWT SP and the start point of the fourth r-TWT SP to be greater than or equal to the EMLSR second transition delay, where the third r-TWT SP and the fourth r-TWT SP are on different links.

In some implementations, the EMLSR second transition delay represents the transition duration of the non-AP MLD operating in the EMLSR mode switching from a single-link frame exchange operation on the EMLSR link to the operation on another link in the EMLSR link.

The value of the EMLSR second transition delay may be greater than or equal to 0.

The values of the EMLSR first transition delay and the EMLSR second transition delay may be the same or different.

The value of the EMLSR second transition delay may be sent in advance by the non-AP MLD to the AP MLD before the non-AP MLD establishes multiple links with the AP MLD or before the non-AP MLD instructs the AP MLD to enter the EMLSR mode.

Figure 8B:
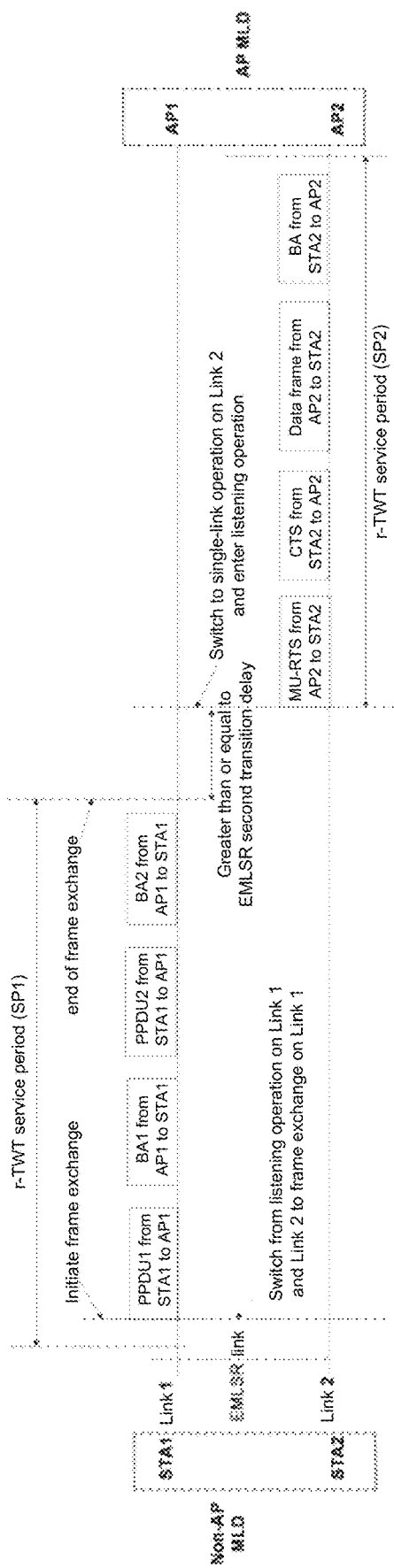
FIG. 8B is a schematic diagram showing an operation mode for a case where r-TWT service periods exist on multiple links of an EMLSR link, in accordance with embodiments of the present application.

FIG. 8B is a schematic diagram showing an operation mode for the case where r-TWT service periods exist on multiple links of an EMLSR link, in accordance with an embodiment of the present application. As shown in FIG. 8B, the non-AP MLD is associated to the AP MLD after the multi-link establishment process, there are two links for the non-AP MLD to establish connection with the AP MLD, such as Link 1 and Link 2 in FIG. 8B. The AP MLD establishing r-TWTs with the non-AP MLD on corresponding links includes: AP1 establishing an r-TWT on Link 1, STA1 being an r-TWT scheduled station and configured to receive or send low-latency service streams during the r-TWT service period (such as SP1 in FIG. 8B); and AP2 establishing an r-TWT on Link 2, STA2 being the r-TWT scheduled station and configured to send or receive low-latency service streams during the r-TWT service period (such as SP2 in FIG. 8B). The time interval between the end time of the r-TWT service period (SP1) on Link 1 and the start time of the adjacent r-TWT service period (SP2) on Link 2 needs to be greater than or equal to the EMLSR second transition delay to ensure that the non-AP MLD has enough time to enter the single-link (Link 2) listening operation before the start point of the r-TWT service period on Link 2 after the frame exchange performed within the r-TWT service period on the current Link 1 is ended. The EMLSR second transition delay may represent the transition duration of the non-AP MLD operating in the EMLSR mode switching from the single-link (e.g., Link 1 in FIG. 8B) frame exchange operation on the EMLSR link to the operation on another link (e.g., Link 2 in FIG. 8B) in the EMLSR link, and after the transition, the listening operation is only performed on Link 2 and no listening operation is performed on Link 1.

The above implementations describe several operation methods for the case where the r-TWT service period exists on multiple links on the EMLSR link. there is a need to ensure that the r-TWT service periods separately scheduled by the AP MLD on two or more links in the EMLSR link do not overlap in time, and/or the time interval between adjacent r-TWT service periods on two links (i.e., the time interval between the end time of the r-TWT service period on one link and the start time of the r-TWT service period on another adjacent link) is greater than or equal to the EMLSR first transition delay/EMLSR second transition delay, so as to ensure that after the frame exchange performed within the r-TWT service period on the current link is ended, the non-AP MLD has enough time to enter the listening operation before the start point of the r-TWT service period on the other link.

In summary, it can be seen that the communication methods proposed in the embodiments of the present application mainly focus on the operational characteristics of the non-AP MLD operating in the EMLSR mode in which data exchange is only allowed on one link in the EMLSR link at one time and the need to protect the channel accessing during the r-TWT service period to meet the low-latency service access requirements of the r-TWT scheduled station, and propose a mechanism and method on how to coordinate operations between links in the EMLSR link in the EMLSR mode to protect channel accessing during the r-TWT service period to which the r-TWT scheduled station operating on the EMLSR link belongs. The above embodiments mainly describe the method on how to coordinate the operations between the links in the EMLSR link to protect the channel accessing during the r-TW service period in the case where there is an r-TWT scheduled station on the EMLSR link, and for operation methods in the EMLMR mode, the solutions in the embodiments of the present application are also applicable thereto.

Figure 9:
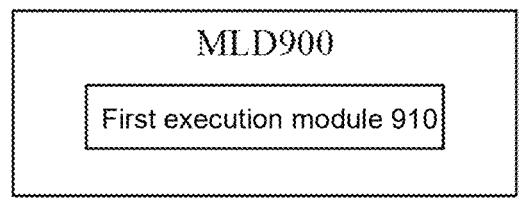
FIG. 9 is a schematic block diagram of an MLD 900, in accordance with an embodiment of the present application.

FIG. 9 is schematic block diagram of an MLD 900, in accordance with an embodiment of the present application. The MLD 900 may include:

a first execution module 910 configured to perform a first operation, the first operation being used to cause a first STA affiliated to a non-AP MLD to enter a listening operation state before a start point of a first r-TWT SP, where the first STA is a r-TWT scheduled station corresponding to the first r-TWT SP.

In some implementations, the non-AP MLD operates in an EMLSR mode, and the first STA is a station on an EMLSR link; or the non-AP MLD operates in an EMLMR mode, and the first STA is a station on an EMLMR link.

In some implementations, the MLD includes the non-AP MLD;

the first execution module 910 belongs to the first STA affiliated to the non-AP MLD; and the first execution module 910 is configured to terminate TXOP initiated by the first STA and/or end frame exchange prior to an EMLSR first transition delay before the start point of the first r-TWT SP, or configured to terminate TXOP initiated by the first STA and/or end frame exchange before the start point of the first r-TWT SP.

In some implementations, the MLD includes the non-AP MLD;

the first execution module 910 belongs to a second STA affiliated to the non-AP MLD; and the first execution module 910 is configured to terminate TXOP initiated by the second STA and/or end frame exchange prior to an EMLSR first transition delay before the start point of the first r-TWT SP, or configured to terminate TXOP initiated by the second STA and/or end frame exchange prior to an EMLSR second transition delay before the start point of the first r-TWT SP; where the second STA is a station except for the first STA among the stations affiliated to the non-AP MLD, and the second STA is a station on the EMLSR link.

In some implementations, the MLD includes an AP MLD associated to the non-AP MLD;

the first execution module 910 belongs to a first AP affiliated to the AP MLD; and the first execution module 910 is configured to terminate TXOP initiated by the first AP and/or end frame exchange prior to a timeout interval before the start point of the first r-TWT SP, or configured to terminate TXOP initiated by the first AP and/or end frame exchange prior to a sum of an EMLSR first transition delay and a timeout interval before the start point of the first r-TWT SP, where the first STA is associated to the first AP.

In some implementations, the MLD includes an AP MLD associated to the non-AP MLD;

the first execution module 910 belongs to a second AP affiliated to the AP MLD; and the first execution module 910 is configured to terminate TXOP initiated by the second AP and/or end frame exchange prior to a sum of the EMLSR first transition delay and a timeout interval before a start point of the first r-TWT SP, or configured to terminate TXOP initiated by the second AP and/or end frame exchange prior to the sum of the EMLSR second transition delay and the timeout interval before the start point of the first r-TWT SP, where the second AP is associated to a second STA, the second STA is a station except for the first STA among the stations affiliated to the non-AP MLD, and the second STA is a station on the EMLSR link.

In some implementations, the AP MLD associated to the non-AP MLD supports the EMLSR mode.

In some implementations, the EMLSR first transition delay represents the transition duration of the non-AP MLD operating in the EMLSR mode switching from a single-link frame exchange operation on the EMLSR link to a listening operation on the EMLSR link.

In some implementations, the value of the EMLSR first transition delay is greater than or equal to 0.

In some implementations, the value of the EMLSR first transition delay is sent by the non-AP MLD to the AP MLD when the non-AP MLD establishes multiple links with the AP MLD or when the non-AP MLD instructs the AP MLD to enter the EMLSR mode.

In some implementations, the EMLSR second transition delay represents a transition duration of a non-AP MLD operating in the EMLSR mode switching from a single-link frame exchange operation on the EMLSR link to an operation on another link in the EMLSR link.

In some implementations, the value of the EMLSR second transition delay is greater than or equal to 0.

In some implementations, the value of the EMLSR second transition delay is sent by the non-AP MLD to the AP MLD when the non-AP MLD establishes multiple links with the AP MLD or when the non-AP MLD instructs the AP MLD to enter the EMLSR mode.

In some implementations, the timeout interval is equal to a sum of aSIFSTime, aSlotTime, and aRxPHYStartDelay; where
- the aSIFSTime represents a time nominally required for MAC and PHY to receive the last symbol or process frame of a frame from WM and respond with a first symbol of an earliest possible response frame on WM;
- the aSlotTime represents a time slot for the MAC to define IFS; and
- the aRxPHYStartDelay represents a delay from the start of PPDU of a receiver antenna to issuance of a physical layer-receive start indication (PHY-RXSTART.indication) primitive.

In some implementations, the listening operation state includes at least one of the following:
- performing clear channel assessment (CCA); or
- being able to receive an initial control frame of a frame exchange sequence sent by the AP MLD.

The MLD 900 of the embodiments of the present application can achieve the corresponding functions of the first MLD in the aforementioned method embodiments. For the processes, functions, implementations and beneficial effects corresponding to each module (submodule, unit or component, etc.) in the MLD 900, reference may be made to the corresponding description in the above method embodiments, which will not be repeated here. It should be noted that the functions described in each module (submodule, unit or component, etc.) in the MLD 900 of the embodiments of the present application may be achieved by different modules (submodules, units or components, etc.) or by a same module (submodule, unit or component, etc.).

Figure 10:
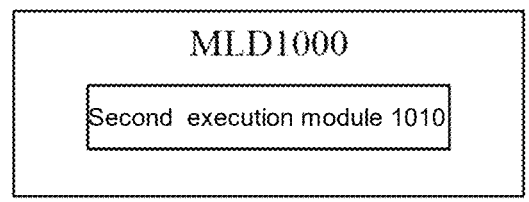
FIG. 10 is a schematic block diagram of an MILD 1000, in accordance with an embodiment of the present application.

FIG. 10 is a schematic block diagram of an MLD 1000, in accordance with an embodiment of the present application. The MLD 1000 may include:
- a second execution module 1010 configured to perform a second operation, the second operation being used to cause or preferentially cause a third STA affiliated to the non-AP MLD to be in a listening operation state or frame exchange operation state during a second r-TWT SP, where the third STA is an r-TWT scheduled station corresponding to the second r-TWT SP.

In some implementations,
- the non-AP MLD operates in an EMLSR mode, and the third STA is a station on an EMLSR link; or
- the non-AP MLD operates in an EMLMR mode, and the third STA is a station on an EMLMR link.

In some implementations, the MLD includes the non-AP MLD;
- the second execution module belongs to a fourth STA affiliated to the non-AP MLD; and
- the second execution module is configured to forbid the fourth STA to acquire TXOP through channel access contention during a period overlapping with the second r-TWT SP, where the fourth STA is a station except for the third STA among the stations affiliated to the non-AP MLD, and the fourth STA is a station on the EMLSR link.

In some implementations, the MLD includes the non-AP MLD;
- the second execution module belongs to a fourth STA affiliated to the non-AP MLD; and
- the second execution module is configured to allow the fourth STA to acquire TXOP through channel access contention during a period overlapping with the second r-TWT SP, and the chance for the fourth STA to acquire TXOP through channel access contention during the period overlapping with the second r-TWT SP is smaller than the chance for the third STA to acquire TXOP through channel access contention during the second r-TWT SP, where the fourth STA is a station except for the third STA among the stations affiliated to the non-AP MLD, and the fourth STA is a station on the EMLSR link.

In some implementations, the chance for the fourth STA to acquire TXOP through channel access contention during the period overlapping with the second r-TWT SP being smaller than the chance for the third STA to acquire TXOP through channel access contention during the second r-TWT SP includes:
- a priority level of an EDCA parameter set used by the fourth STA for channel access contention during the period overlapping with the second r-TWT SP being lower than that of an EDCA parameter set used by the third STA for channel access contention during the second r-TWT SP.

In some implementations, the second r-TWT SP includes a non trigger-enabled r-TWT SP.

In some implementations, the MLD includes an AP MLD associated to the non-AP MLD;
- the second execution module belongs to a fourth AP affiliated to the AP MLD; and
- the second execution module is configured to: forbid a fourth AP to initiate a frame exchange with the fourth STA during the second r-TWT SP, or control the time interval during which the fourth AP initiates the frame exchange with the fourth STA not to overlap with the second r-TWT SP;
- where the fourth AP is associated to the fourth STA, the fourth STA is a station except for the third STA among the stations affiliated to the non-AP MLD, and the fourth STA is a station on the EMLSR link.

In some implementations, the AP MLD associated to the non-AP MLD supports the EMLSR mode.

In some implementations, the listening operation state includes at least one of the following:
- performing clear channel assessment (CCA); or
- being able to receive an initial control frame of the frame exchange sequence sent by the AP MLD.

The MLD 1000 of the embodiments of the present application can achieve the corresponding functions of the second MLD in the aforementioned method embodiments. For the processes, functions, implementation methods and beneficial effects corresponding to each module (submodule, unit or component, etc.) in the MLD 1000, reference may be made to the corresponding description in the above method embodiments, which will not be repeated here. It should be noted that the functions described in each module (submodule, unit or component, etc.) in the MLD 1000 of the embodiments of the present application may be achieved by different modules (submodules, units or components, etc.) or by a same module (submodule, unit or component, etc.).

Figure 11:
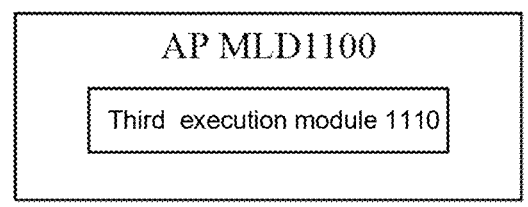
FIG. 11 is a schematic block diagram of an AP MLD 1100, in accordance with an embodiment of the present application.

FIG. 11 is a schematic block diagram of an AP MLD 1100, in accordance with an embodiment of the present application. The AP MLD 1100 may include:

a third execution module 1110 configured to perform a third operation, where the third operation is used to make r-TWT SPs separately scheduled on two or more links not overlap in time.

In some implementations, the links include an EMLSR link or an EMLMR link.

In some implementations, the third execution module 1110 is configured to:

cause a time interval between an end time of the third r-TWT SP and a start time of the fourth r-TWT SP to be greater than or equal to an EMLSR first transition delay, where the third r-TWT SP and the fourth r-TWT SP are on different links.

In some implementations, the EMLSR first transition delay represents the transition duration of a non-AP MLD operating in the EMLSR mode switching from a single-link frame exchange operation on the EMLSR link to a listening operation on the EMLSR link.

In some implementations, the value of the EMLSR first transition delay is greater than or equal to 0.

In some implementations, the value of the EMLSR first transition delay is sent by the non-AP MLD to the AP MLD when the non-AP MLD establishes multiple links with the AP MLD or when the non-AP MLD instructs the AP MLD to enter the EMLSR mode.

In some implementations, the third execution module 1110 is configured to:

cause a time interval between an end time of the third r-TWT SP and a start time of the fourth r-TWT SP to be greater than or equal to an EMLSR second transition delay, where the third r-TWT SP and the fourth r-TWT SP are on different links.

In some implementations, the EMLSR second transition delay represents the transition duration of a non-AP MLD operating in the EMLSR mode switching from a single-link frame exchange operation on the EMLSR link to an operation on another link in the EMLSR link.

In some implementations, the value of the EMLSR second transition delay is greater than or equal to 0.

In some implementations, the value of the EMLSR second transition delay is sent by the non-AP MLD to the AP MLD when the non-AP MLD establishes multiple links with the AP MLD or when the non-AP MLD instructs the AP MLD to enter the EMLSR mode.

The AP MLD 1100 in the embodiments of the present application can achieve the corresponding functions of the AP MLD in the aforementioned method embodiments. For the processes, functions, implementation methods and beneficial effects corresponding to each module (submodule, unit or component, etc.) in the AP MLD 1100, reference may be made to the corresponding description in the above method embodiments, which will not be repeated here. It should be noted that the functions described in each module (submodule, unit or component, etc.) in the AP MLD 1100 of the embodiments of the present application may be achieved by different modules (submodules, units or components, etc.) or by a same module (submodule, unit or component, etc.).

Figure 12:
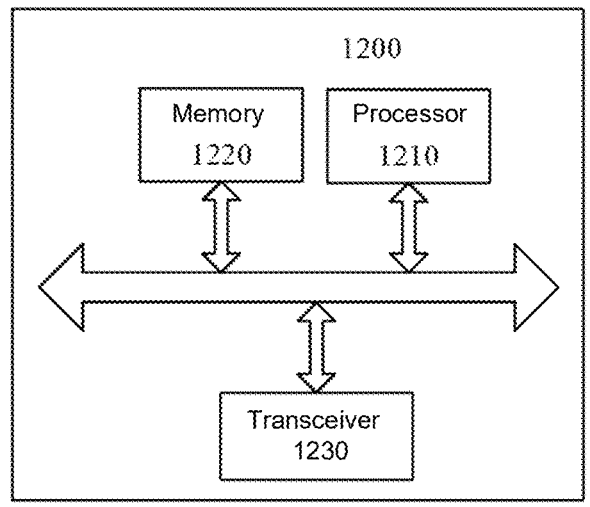
FIG. 12 is a schematic structural diagram of an MLD 1200, in accordance with an embodiment of the present application.

FIG. 12 is a schematic structural diagram of an MLD 1200, in accordance with embodiments of the present application. The MLD 1200 includes a processor 1210, and the processor may call and execute computer programs from a memory to cause the MLD 1200 to perform the communication method in the embodiments of the present application.

In a possible implementation, the MLD 1200 may further include a memory 1220. The processor 1210 may call and execute computer programs from the memory 1220 to cause the MLD 1200 to perform the communication method in the embodiments of the present application.

The memory 1220 may be a separate device independent from the processor 1210, and may also be integrated into the processor 1210.

In a possible implementation, the MLD 1200 may further include a transceiver 1230, and the processor 1210 may control the transceiver 1230 to communicate with other devices, for example, to send information or data to other devices or to receive information or data sent by other devices.

The transceiver 1230 may include a transmitter and a receiver. The transceiver 1230 may further include antenna(s), and the quantity of the antenna may be one or more.

In a possible implementation, the MLD 1200 may be the AP MLD or non-AP MLD in the embodiments of the present application, and the MLD 1200 may perform the corresponding processes performed by the AP MLD or non-AP MLD in various methods of the embodiments of the present application, which will not be repeated here for conciseness.

Figure 13:
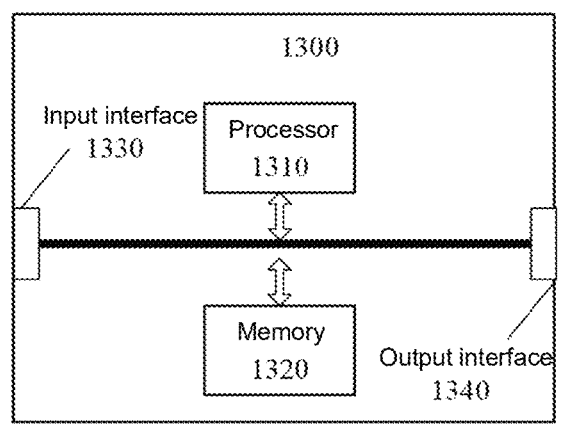
FIG. 13 is a schematic block diagram of a chip, in accordance with embodiments of the present application.

FIG. 13 is a schematic structural diagram of a chip 1300, in accordance with an embodiment of the present application. The chip 1300 includes a processor 1310, and the processor 1310 may call and execute computer programs from a memory to perform the method in the embodiments of the present application.

In a possible implementation, the chip 1300 may further include a memory 1320. The processor 1310 may call and execute computer programs from the memory 1320 to perform the method performed by the AP MLD or non-AP MLD in the embodiments of the present application.

The memory 1320 may be a separate device independent from the processor 1310, and may also be integrated into the processor 1310.

In a possible implementation, the chip 1300 may further include an input interface 1330. The processor 1310 may control the input interface 1330 to communicate with other devices or chips, and for example, to acquire information or data sent by other devices or chips.

In a possible implementation, the chip 1300 may further include an output interface 1340. The processor 1310 may control the output interface 1340 to communicate with other devices or chips, and for example, output information or data to other devices or chips.

In a possible implementation, the chip may be applied to the AP MLD or non-AP MLD in the embodiments of the present application, and the chip may perform the corresponding processes performed by the AP MLD or non-AP MLD in various methods of the embodiments of the present application, which will not be repeated here for conciseness.

The chips applied to the AP MLD and the non-AP MLD may be the same or different.

It should be understood that the chip mentioned in the embodiments of the present application may also be referred to as a system-level chip, a system chip, a chip system or a system-on-chip.

The above-mentioned processor may be a general purpose processor, a digital signal processor (DSP), a field programmable gate array (FPGA), an application specific integrated circuit (ASIC) or other programmable logic devices, transistor logic devices, discrete hardware components, etc. The above-mentioned general purpose processor may be a microprocessor or any conventional processor.

The above-mentioned memory may be a volatile (transitory) memory or a non-volatile (non-transitory) memory, or may include both the volatile memory and the non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM).

It should be understood that the above-mentioned memory is described exemplarily but not restrictively. For example, the memory in the embodiments of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM) or a direct rambus RAM (DR RAM). That is, the memory in the embodiments of the present application is intended to include but is not limited to these and any other suitable types of memory.

The above embodiments may be implemented in whole or in part through software, hardware, firmware, or any combination thereof. When implemented by using a software, the above embodiments may be implemented in whole or in part in a form of a computer program product. The computer program product includes one or more computer instructions. When the computer program instructions are loaded on and executed by a computer, processes or functions according to the embodiments of the present application are generated in whole or in part. The computer may be a general purpose computer, a dedicated computer, a computer network, or any other programmable device. The computer instructions may be stored in a non-transitory computer-readable storage medium or transmitted from a non-transitory computer-readable storage medium to another non-transitory computer-readable storage medium. For example, the computer instructions may be transmitted from a website, computer, server or data center to another website, computer, server or data center via a wired manner (e.g., coaxial cable, optical fiber, or digital subscriber line (DSL)) or a wireless manner (e.g., infrared, wireless or microwave). The non-transitory computer-readable storage medium may be any available medium able to be accessed by the computer, or may be a data storage device, such as a server or a data center, integrated by one or more available media. The available medium may be a magnetic medium (e.g., a floppy disk, a hard disk or a magnetic tape), an optical medium (e.g., a DVD), a semiconductor medium (e.g., a solid state drive (SSD)), or the like.

It should be understood that in the various embodiments of the present application, the magnitude of the serial number of each of the above-mentioned processes does not mean the order of execution. The order of execution of each process shall be determined by its function and internal logic, and shall not constitute any limitation on the implementation process of the embodiments of the present application.

Those skilled in the art can clearly understand that for the convenience and simplicity of description, the working processes of the systems, devices and units described above may refer to the corresponding processes in the above method embodiments, and details will not be repeated here.

The foregoing descriptions are merely exemplary implementations of the present application, but the protection scope of the present application is not limited thereto. Any skilled person in the art could readily conceive of changes or replacements within the technical scope of the present application, which shall all be included in the protection scope of the present application. Therefore, the protection scope of the present application shall be subject to the protection scope of the claims.

What is claimed is:

1. A communication method, comprising:
performing, by a first multi-link device (MLD), a first operation, the first operation being used to cause a first station (STA) affiliated to a non-access point (non-AP) MLD to enter a listening operation state before a start point of a first restricted target wake time (r-TWT) service period (SP), wherein the first STA is an r-TWT scheduled station corresponding to the first r-TWT SP, the non-AP MLD operates in an enhanced multi-link single radio (EMLSR) mode, and the first STA is a station on an EMLSR link; wherein
the first MLD comprises the non-AP MLD; and
the performing, by the first MLD, the first operation comprises:
a second STA affiliated to the non-AP MLD terminating TXOP initiated by the second STA prior to an EMLSR first transition delay before the start point of the first r-TWT SP; wherein the second STA is a station except for the first STA among stations affiliated to the non-AP MLD, and the second STA is a station on an EMLSR link.

2. The method according to claim 1, wherein the EMLSR first transition delay represents a transition duration of the non-AP MLD operating in an EMLSR mode switching from a single-link frame exchange operation on an EMLSR link to a listening operation on the EMLSR link.

3. The method according to claim 2, wherein a value of the EMLSR first transition delay is greater than or equal to 0;
or
a value of the EMLSR first transition delay is sent by the non-AP MLD to an AP MLD when the non-AP MLD establishes multiple links with the AP MLD or the non-AP MLD instructs the AP MLD to enter the EMLSR mode.

4. The method according to claim 1, wherein in a case where the non-AP MLD and an AP MLD support an EMLSR mode, and the non-AP MLD operates in the EMLSR mode on an EMLSR link, the first STA of the non-AP MLD on the EMLSR link establishes a r-TWT with a first AP associated with the AP MLD, and the first STA is the r-TWT scheduled station of a specific r-TWT SP, and there is a need to ensure that the first STA is in the listening operation state before a start of the r-TWT SP.

5. The method according to claim 1, wherein for a second STA of the non-AP MLD on an EMLSR link, if the second STA is a TXOP Holder before or no later than a start of a r-TWT SP on a link where the first STA is located, there is a need to ensure that the second STA terminates a TXOP initiated by the second STA or terminates frame exchange initiated by the second STA prior to an EMLSR first transition delay time before a start point of the r-TWT SP, so as to ensure that the first STA enters the listening operation state before the start of the r-TWT SP.

6. The method according to claim 1, wherein for a second STA of the non-AP MLD on an EMLSR link, in response that the second STA performs frame exchange with an associated AP affiliated to an AP MLD before or no later than a start of a r-TWT SP on a link where STA1 is located, and the frame exchange is initiated by the associated, there is a need to ensure that the AP MLD terminates the frame exchange with the second STA or terminates a TXOP prior to an EMLSR first transition delay duration before a start point of the r-TWT SP, so as to ensure that the first STA enters the listening operation state before the start of the r-TWT SP; and, in order for the second STA determining an end of the frame exchange, there is a need to ensure that after the associated AP receives last PPDU end time sent by the second STA, a duration left for the second STA is greater than or equal to a timeout interval to determine the end of the frame exchange, and the associated AP needs to terminate a TXOP initiated by the associated AP and/or terminate the frame exchange prior to a sum of an EMLSR first transition delay and the timeout interval before or no later than a start point of the r-TWT SP.

7. A multi-link device (MLD), wherein the MLD is a first MLD comprising a processor and a memory, wherein the memory is configured to store a computer program, and the processor is configured to call and execute the computer program stored on the memory to cause the first MLD to perform:
   performing a first operation, the first operation being used to cause a first station (STA) affiliated to a non-access point (non-AP) MLD to enter a listening operation state before a start point of a first restricted target wake time (r-TWT) service period (SP), wherein the first STA is an r-TWT scheduled station corresponding to the first r-TWT SP, the non-AP MLD operates in an enhanced multi-link single radio (EMLSR) mode, and the first STA is a station on an EMLSR link; wherein
   the first MLD comprises the non-AP MLD;
   a second STA affiliated to the non-AP MLD terminating TXOP initiated by the second STA prior to an EMLSR first transition delay before the start point of the first r-TWT SP; wherein the second STA is a station except for the first STA among stations affiliated to the non-AP MLD, and the second STA is a station on an EMLSR link.

8. The MLD according to claim 7, wherein the EMLSR first transition delay represents a transition duration of the non-AP MLD operating in an EMLSR mode switching from a single-link frame exchange operation on an EMLSR link to a listening operation on the EMLSR link.

9. The MLD according to claim 8, wherein a value of the EMLSR first transition delay is greater than or equal to 0; or
   a value of the EMLSR first transition delay is sent by the non-AP MLD to an AP MLD when the non-AP MLD establishes multiple links with the AP MLD or the non-AP MLD instructs the AP MLD to enter the EMLSR mode.

10. The MLD according to claim 7, wherein in a case where the non-AP MLD and an AP MLD support an EMLSR mode, and the non-AP MLD operates in the EMLSR mode on an EMLSR link, the first STA of the non-AP MLD on the EMLSR link establishes a r-TWT with a first AP associated with the AP MLD, and the first STA is the r-TWT scheduled station of a specific r-TWT SP, and there is a need to ensure that the first STA is in the listening operation state before a start of the r-TWT SP.

11. The MLD according to claim 7, wherein for a second STA of the non-AP MLD on an EMLSR link, if the second STA is a TXOP Holder before or no later than a start of a r-TWT SP on a link where the first STA is located, there is a need to ensure that the second STA terminates a TXOP initiated by the second STA or terminates frame exchange initiated by the second STA prior to an EMLSR first transition delay time before a start point of the r-TWT SP, so as to ensure that the first STA enters the listening operation state before the start of the r-TWT SP.

12. The MLD according to claim 7, wherein for a second STA of the non-AP MLD on an EMLSR link, in response that the second STA performs frame exchange with an associated AP affiliated to an AP MLD before or no later than a start of a r-TWT SP on a link where STA1 is located, and the frame exchange is initiated by the associated, there is a need to ensure that the AP MLD terminates the frame exchange with the second STA or terminates a TXOP prior to an EMLSR first transition delay duration before or no later than a start point of the r-TWT SP, so as to ensure that the first STA enters the listening operation state before the start of the r-TWT SP; and, in order for the second STA determining an end of the frame exchange, there is a need to ensure that after the associated AP receives last PPDU end time sent by the second STA, a duration left for the second STA is greater than or equal to a timeout interval to determine the end of the frame exchange, and the associated AP needs to terminate a TXOP initiated by the associated AP and/or terminate the frame exchange prior to a sum of an EMLSR first transition delay and the timeout interval before or no later than a start point of the r-TWT SP.

* * * * *